United States Patent
Kolan

(10) Patent No.: US 12,368,765 B2
(45) Date of Patent: Jul. 22, 2025

(54) METHODS AND APPARATUS FOR NETWORK ASSISTED STREAM SYNCHRONIZATION FOR MEDIA SERVICES USING NETWORK SLICING

(71) Applicant: Samsung Electronics Co., Ltd., Suwon-si (KR)

(72) Inventor: Prakash Reddy Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/310,734

(22) Filed: May 2, 2023

(65) Prior Publication Data
US 2023/0370514 A1 Nov. 16, 2023

Related U.S. Application Data

(60) Provisional application No. 63/348,337, filed on Jun. 2, 2022, provisional application No. 63/340,760, filed on May 11, 2022.

(51) Int. Cl.
*H04L 65/752* (2022.01)
*H04W 56/00* (2009.01)

(52) U.S. Cl.
CPC .......... *H04L 65/752* (2022.05); *H04W 56/00* (2013.01)

(58) Field of Classification Search
CPC ........ H04L 65/60; H04L 65/75; H04L 65/752
See application file for complete search history.

(56) References Cited

U.S. PATENT DOCUMENTS

| | | | | |
|---|---|---|---|---|
| 2014/0362704 A1* | 12/2014 | Jha | ...... | H04N 21/2401 370/237 |
| 2015/0222549 A1* | 8/2015 | Kakadia | ...... | H04L 47/283 370/231 |
| 2020/0383043 A1 | 12/2020 | Wei et al. | | |
| 2021/0029580 A1* | 1/2021 | Gupta | ...... | H04W 36/023 |
| 2021/0105308 A1 | 4/2021 | Bouazizi et al. | | |

(Continued)

FOREIGN PATENT DOCUMENTS

| IN | 202141043424 | * 9/2021 |
|---|---|---|
| KR | 10-2022-0047391 A | 4/2022 |

OTHER PUBLICATIONS

International Search Report and Written Opinion issued Aug. 21, 2023 regarding International Application No. PCT/KR2023/006379, 7 pages.

(Continued)

*Primary Examiner* — Joshua Joo

(57) ABSTRACT

An apparatus includes a communication interface and a processor operably coupled to the communication interface. The communication interface is configured to receive from an application service provider, expected stream parameters for a plurality of media streams provided over at least one network slice. The communication interface is also configured to receive actual stream parameters for each of the media streams. The processor is configured to determine stream transmission condition information for each of the media streams, wherein the stream transmission condition information is based on a comparison of the actual stream parameters and the expected stream parameters. The processor is also configured to perform stream synchronization based on the stream transmission condition information.

10 Claims, 20 Drawing Sheets

(56) References Cited

U.S. PATENT DOCUMENTS

| | | | | |
|---|---|---|---|---|
| 2021/0211479 | A1* | 7/2021 | Trim | H04L 65/80 |
| 2021/0218647 | A1* | 7/2021 | Rangarajan | H04L 43/026 |
| 2022/0029898 | A1* | 1/2022 | Cociglio | H04L 1/203 |
| 2022/0131756 | A1* | 4/2022 | Kushwaha | H04L 43/0876 |
| 2023/0100377 | A1* | 3/2023 | Ramappa | H04W 48/18 |
| | | | | 726/4 |
| 2023/0284111 | A1* | 9/2023 | Nobe | H04W 36/362 |
| | | | | 370/331 |
| 2023/0300049 | A1* | 9/2023 | Cakulev | H04L 43/0817 |
| | | | | 709/224 |
| 2023/0370363 | A1* | 11/2023 | Padi | H04L 45/125 |
| 2024/0107476 | A1* | 3/2024 | Leung | H04W 56/0045 |

OTHER PUBLICATIONS

"3rd Generation Partnership Project; Technical Specification Group Services and System Aspects; Study on 5G media streaming extensions (Release 17)", 3GPP TR26.804 V17.0.0, Mar. 2022, 129 pages.

China Mobile et al., "Introduction of text for Tactile and multi-modal communication service", 3GPP TSG-SA1 Meeting #96e, S1-214324, Nov. 2021, 10 pages.

Ericsson LM et al., "Corrections on Procedures and APIs for Downlink and Uplink Streaming", 3GPP TSG-SA4 Meeting #112e, S4-210317, Feb. 2021, 38 pages.

Qualcomm Incorporated et al., "Corrections and Clarifications on Network Assistance", 3GPP TSG-SA4 Meeting #110-e, S4-201224, Aug. 2020, 13 pages.

"3rd Generation Partnership Project; Technical Specification Group Services and System Aspects; 5G Media Streaming (5GMS); General description and architecture (Release 18)", 3GPP TS 26.501 V18.0.0, Dec. 2022, 143 pages.

"3rd Generation Partnership Project; Technical Specification Group Services and System Aspects; Study on 5G media streaming extensions (Release 17)", 3GPP TR 26.804 V17.1.0, Sep. 2022, 130 pages.

"3rd Generation Partnership Project; Technical Specification Group Services and System Aspects; Study on supporting tactile and multi-modality communication services; Stage 1 (Release 18)," 3GPP TR 22.847 V18.2.0, Mar. 2022, 35 pages.

"3rd General Partnership Project; Technical Specification Group Services and System Aspects; Network Slicing Extensions for 5G media services; (Release 18)," 3GPP TR 26.941 V0.2.0, Aug. 2022, 16 pages.

"3rd Generation Partnership Project; Technical Specification Group Services and System Aspects; 5G Media Streaming (5GMS); Protocols (Release 17)," 3GPP TS 26.512 V17.1.0, Jun. 2022, 165 pages.

Extended European Search Report issued Apr. 15, 2025 regarding Application No. 23803854.1, 12 pages.

Mannweiler et al., "5G Mobile Network Architecture for diverse services, use cases, and applications in 5G and beyond", H2020-ICT-2016-2, 5G-MONArch, Project No. 761445, Apr. 2019, 165 pages.

* cited by examiner

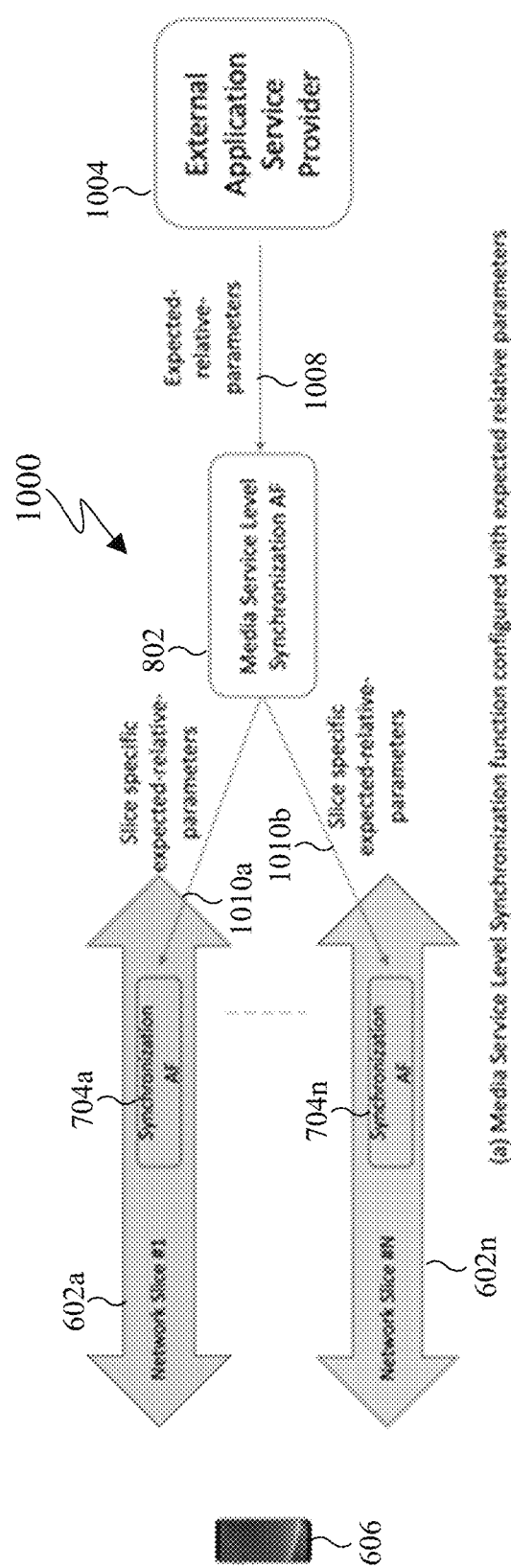
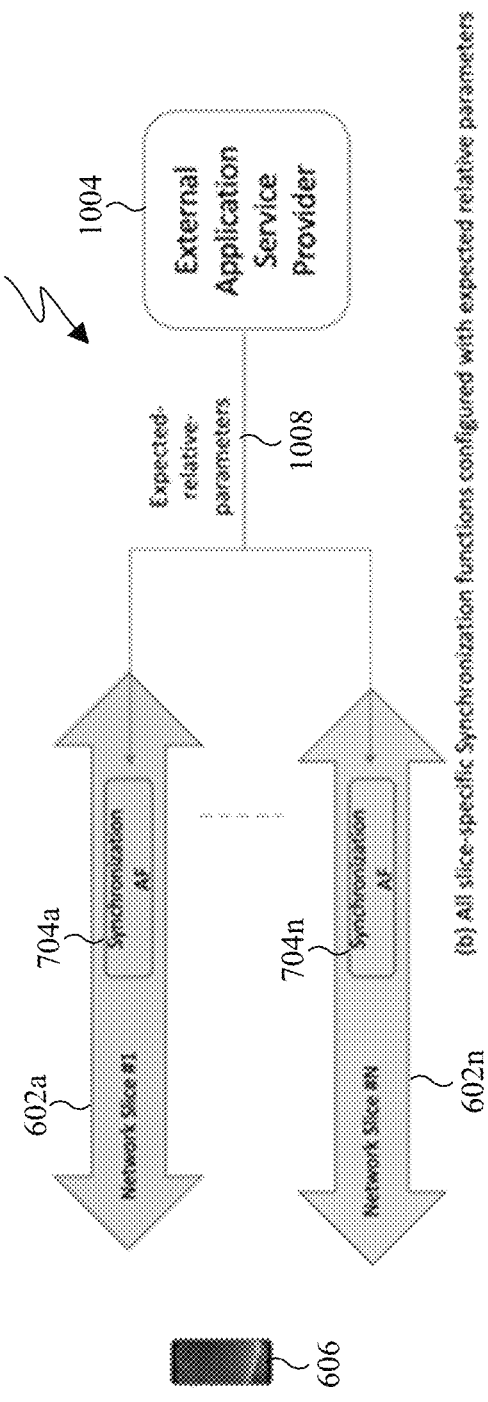
FIG. 10A
FIG. 10B

METHODS AND APPARATUS FOR NETWORK ASSISTED STREAM SYNCHRONIZATION FOR MEDIA SERVICES USING NETWORK SLICING

CROSS-REFERENCE TO RELATED APPLICATION AND PRIORITY CLAIM

This application claims priority under 35 U.S.C. § 119(e) to U.S. Provisional Patent Application No. 63/340,760 filed on May 11, 2022, and U.S. Provisional Patent Application No. 63/348,337 filed on Jun. 2, 2022, which are hereby incorporated by reference in their entirety.

TECHNICAL FIELD

This disclosure relates generally to multimedia devices and processes. More specifically, this disclosure relates to methods and apparatus for network assisted stream synchronization for media service using network slicing.

BACKGROUND

Fifth generation (5G) networks offer a number of architecture enablers that were not available with the older networks. An example of such an architecture enabler is network slicing where multiple logical networks can be provisioned by the operator with the same underlying physical and virtual resources. Each slice can provide a different level of QoS, which can help with deploying applications with varying QoS requirements. With network slicing, different data/media streams of an application with different QoS requirements can be delivered using different network slices is becoming possible. When such data or media streams of an application are delivered using different network slices, synchronization issues may pop up due to different traffic treatment of those streams between each slice. In addition, due to the presence of different virtual and physical compute resources in different network slices and different network configuration of different network slices, streams delivered in different network slices are highly likely to not arrive at the required destination at the required time. Thus, network assisted synchronization methods are imperative to help along with client based synchronization methods.

SUMMARY

This disclosure provides methods and apparatus for network assisted stream synchronization for media service using network slicing.

In a first embodiment, an apparatus includes a communication interface and a processor operably coupled to the communication interface. The communication interface is configured to receive from an application service provider, expected stream parameters for a plurality of media streams provided over at least one network slice. The communication interface is also configured to receive actual stream parameters for each of the media streams. The processor is configured to determine stream transmission condition information for each of the media streams, wherein the stream transmission condition information is based on a comparison of the actual stream parameters and the expected stream parameters. The processor is also configured to perform stream synchronization based on the stream transmission condition information.

In a second embodiment, a method includes receiving, from an application service provider, expected stream parameters for a plurality of media streams provided over at least one network slice. The method also includes receiving actual stream parameters for each of the media streams. The method further includes determining stream transmission condition information for each of the media streams, wherein the stream transmission condition information based on a comparison of the actual stream parameters and the expected stream parameters. The method additionally includes performing stream synchronization based on the stream transmission condition information.

In a third embodiment, an apparatus includes a communication interface and a processor operably coupled to the communication interface. The communication interface is configured to receive stream transmission condition information from a slice synchronization function, where the stream transmission condition information is based on a comparison of actual stream information for media streams and expected stream parameters associated with an application service provider. The processor is configured to determine a time for decoding and presenting media content based on the stream transmission condition information. The processor is also configured to identify parameter changes between a current time and the determined time. The processor is further configured to update buffer sizes based on the identified parameter changes.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate an expected stream condition information configured by an application service provider in accordance with this disclosure;

DETAILED DESCRIPTION

Figure 1:
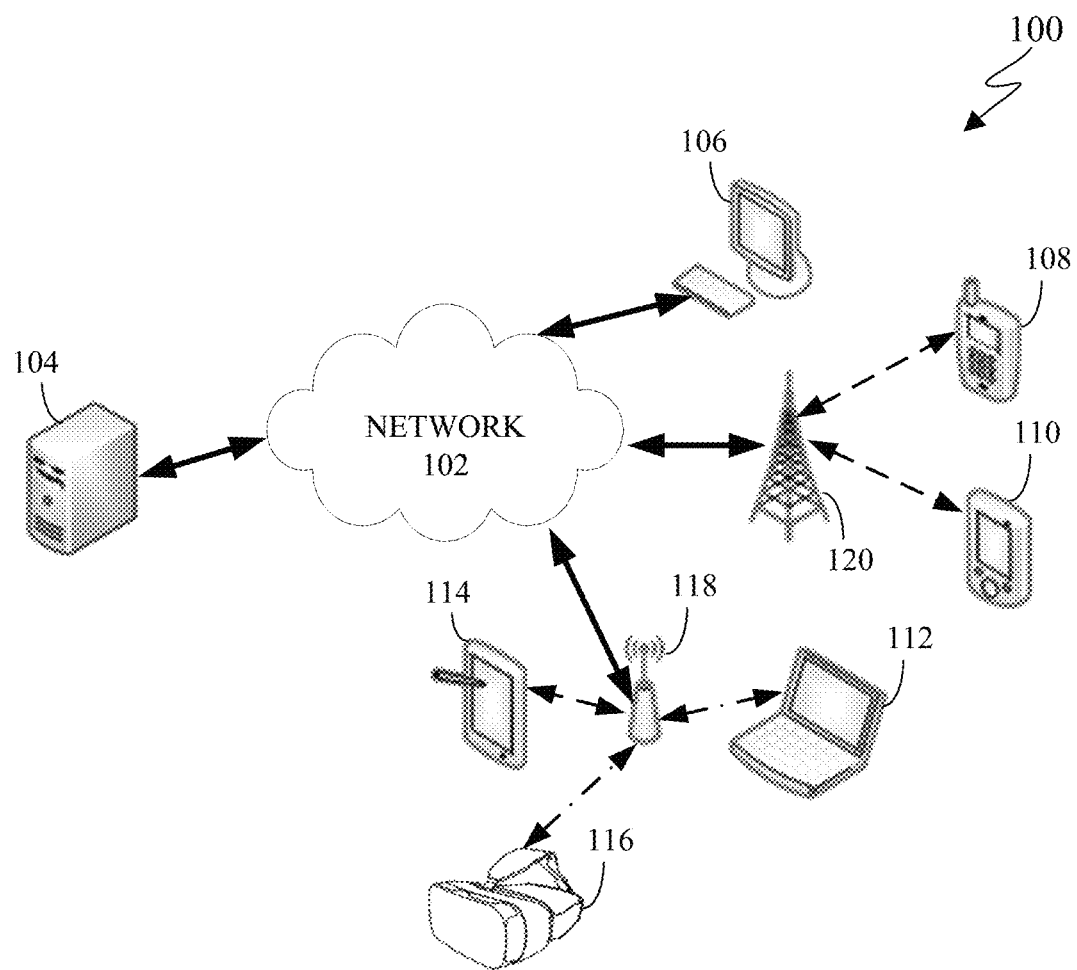
FIG. 1 illustrates an example communication system in accordance with an embodiment of this disclosure.

FIGS. 1 through 21, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Network slicing is an architecture enabler that is built natively into the 5G system. With differentiated quality of service (QoS) offerings, network slicing can help applications that deliver application components with different QoS requirements. Many 5G media services are being standardized that require delivery of media stream components with different delivery characteristics, which can be achieved using multiple network slicing. Media service application components delivered using network slicing are likely to arrive out of order at the destination, which makes synchronization of streams important. This disclosure describes methods and aspects related to synchronization of the delivery of different media stream components delivered using different network slices. While traditional synchronization methods depended on client and server managed technologies with packet and frame packing, this disclosure proposes methods for network assisted synchronization methods that can be used along with client dependent synchronization methods.

In particular, this disclosure provides for synchronization of media stream delivered within a same network slice and between different network slices. The disclosure also provides for slice collaboration to assist with stream synchronization and network assistance to a UE with synchronization information for application buffer management. Inter slice synchronization and intra-slice synchronization are described for exchanges of stream delivery information. Delivery of media streams transferred in different slices can be traced.

Network slicing is an important architectural enabler for 5G networks. Any service (e.g., media service) can be delivered to end users in one or more network slices. Each network slice can have a different QoS configuration compared to other network slices. With newer 5G architectures, more complex media services are being developed that require differential QoS treatment for constituent media streams. Network slicing can be used to provide the required QoS differentiation of different component streams of the media service. However, the advantage of differential QoS with network slicing brings complexities for service realization that did not exist with older media delivery technologies. One such complexity is the issue of stream synchronization. It is imperative that 5G media delivery technologies using network slicing addresses the problem of stream synchronization without which network slicing cannot be considered an enabler to realize complex 5G media services.

When a media service is realized using 5G network slicing, different media component streams of a media service can be delivered to the end user using different network slices, thus providing a different level of QoS to different media component streams which is required for newer 5G media services. With such a delivery architecture using network slicing, one important problem that needs immediate attention is stream synchronization. Traditional stream synchronization methods relied on synchronization at end users (UE) because traditional media services delivered multiplexed or interleaved different media stream components as one packet stream, and the UE reassembled and repackaged them as different streams at its end. However, with network slicing, with the possibility that different media streams are delivered to end users with different level of QoS, it is very likely that media stream components may not be available at the UE at the required times. This disclosure proposes methods for stream synchronization in the above scenarios.

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

Figure 2:
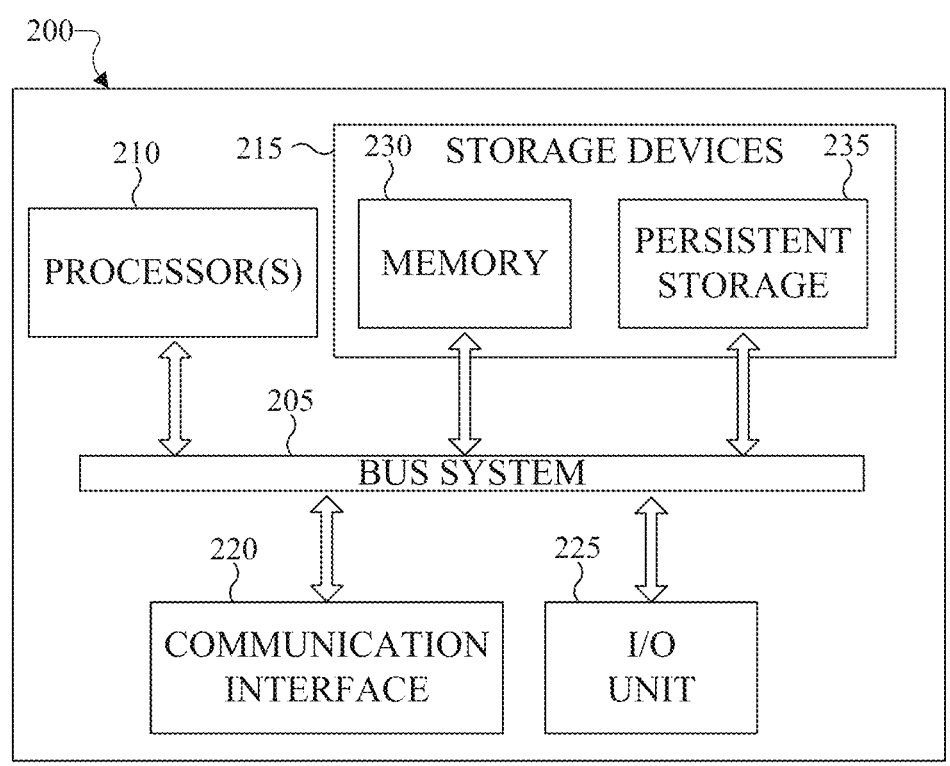
FIGS. 2 and 3 illustrate example electronic devices in accordance with an embodiment of this disclosure.
Figure 3:
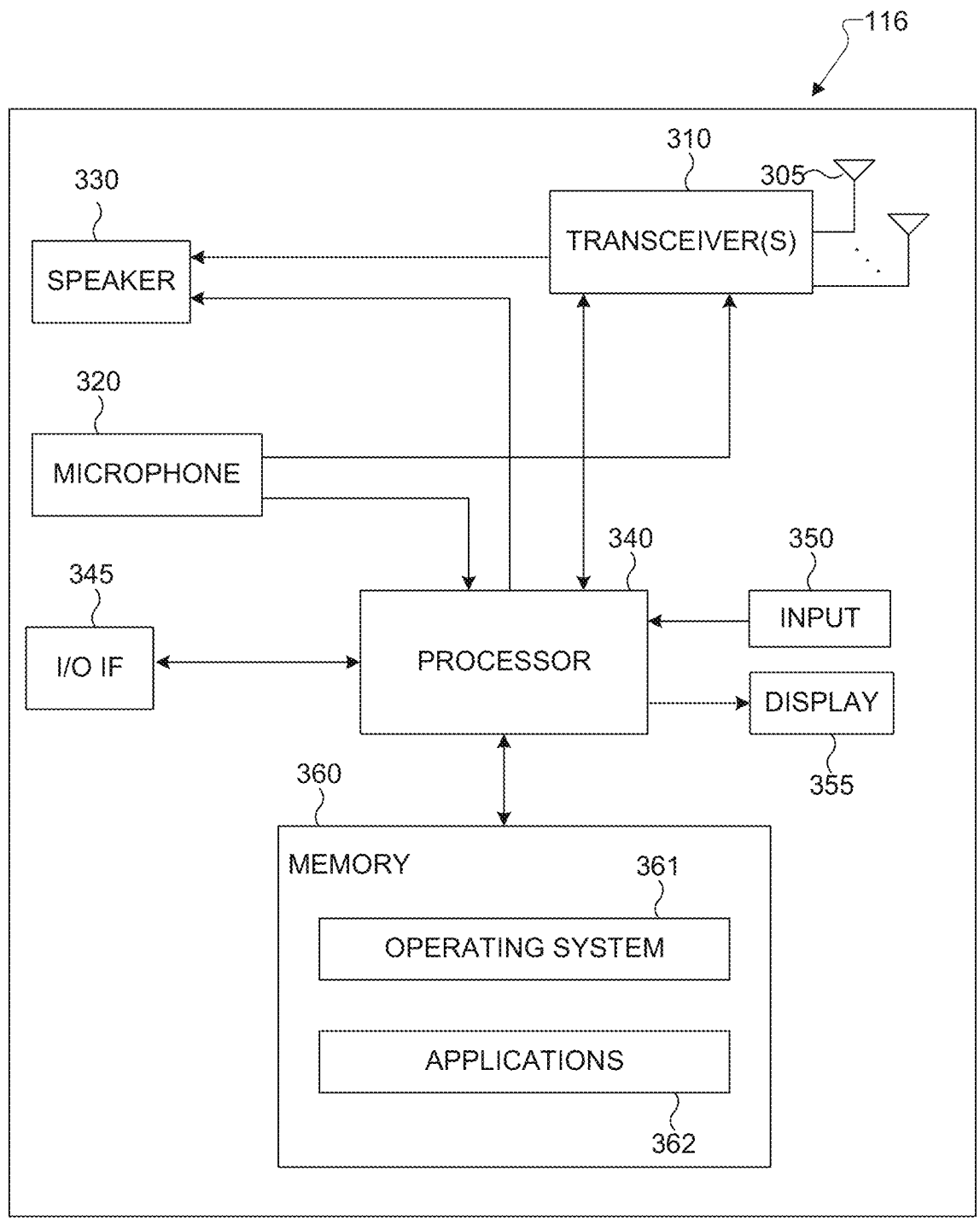

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMID, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. In certain embodiments, each server 104 can include an encoder. In certain embodiments, the server 104 can synchronize media component streams transmitted over multiple network slices to the client devices 106-116.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations 120 or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104. In certain embodiments, the client devices 106-114 can receive stream transmission condition information and update buffers according to times for decoding indicated by the stream transmission condition information and measured times.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can support synchronization of media flows transferred through the same or separate network slices.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a information related to network assisted stream synchronization for media service using network slicing to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to RX processing circuitry that generates a processed baseband signal by filtering, decoding, and/or digitizing the baseband or intermediate frequency signal. RX processing circuitry transmits the processed baseband signal to the speaker 330 (such as for voice data) or to the processor 340 for further processing (such as for web browsing data).

TX processing circuitry receives analog or digital voice data from the microphone 320 or other outgoing baseband data from the processor 340. The outgoing baseband data can include web data, e-mail, or interactive video game data. TX processing circuitry encodes, multiplexes, and/or digitizes the outgoing baseband data to generate a processed baseband or intermediate frequency signal. The RF transceiver 310 receives the outgoing processed baseband or intermediate frequency signal from TX processing circuitry and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry. In certain embodiments, the processor 340 can synchronize media flows that are delivered over separate network slices.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content in multiple media flows over separate network slices. The processor 340 can support synchronization of the media flows transmitted to a media device.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMID. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
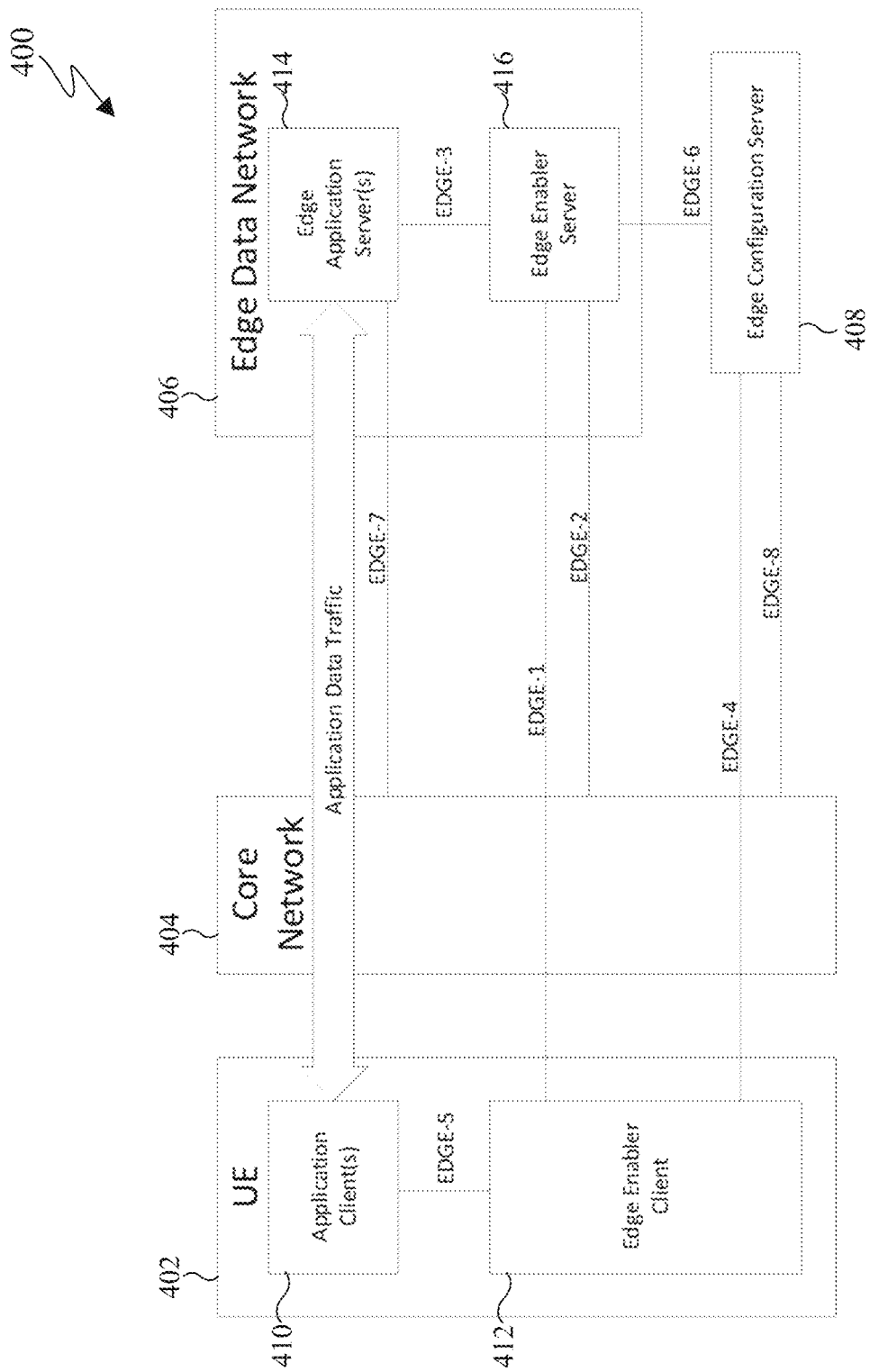
FIG. 4 illustrates an example architecture for enabling edge application in accordance with this disclosure.

FIG. 4 illustrates an example architecture 400 for enabling edge application in accordance with this disclosure. The embodiment of the edge application architecture 400 illustrated in FIG. 4 is for illustration only. FIG. 4 does not limit the scope of this disclosure to any particular implementation of an electronic device.

As shown in FIG. 4, the edge application architecture 400 includes network components 402-408 and interfaces 410-416 between those network components that can offer edge-based applications. The network components 402-408 can include a user equipment (UE) 402, a core network 404, an edge network 406, and an edge configuration server (ECS) 408. The interfaces 410-416 can include an application client 410, an edge enabler client 412, an edge application server 414, and an edge enabler server (EES) 416. The edge application server 414, the edge enabler server 416 and the edge configuration server 408 can be represented by the server 200 shown in FIG. 2.

The UE 402 is a device that generates volumetric content related to a user and transmits the volumetric content to the edge network. The UE 402 receives mixed volumetric content of other users in a conference setting and renders the volumetric content in the conference setting. The UE 402 can include the application client 410 and the edge enabler client 412. The UE 402 can represent one or the client devices 106-114 shown in FIG. 1 or the electronic device 300 shown in FIG. 3

The core network 404 can assign the UE 402 to a specific node in the edge network 406. The core network 404 can direct volumetric content from the UE 402 and other UE to an edge network 406.

The edge network 406 can include media resource functions that operate to process and mix the volumetric content from the UE 402 and mix the content of other UE into a conference scene that is provided back to the UE 402. The edge network 406 can include the edge application server 414 and the EES 416. A third-generation partnership project (3GPP) system architecture and services (SA2) sub working group (SWG) defines that an edge network can be implemented as a Local Area Data Network (LADN). The premise of the edge network is that it is closer to the UE, so therefore can provide services with better latency. Application services deployed within the edge network process media destined to/originating from the UE for faster application performance.

The ECS 408 is a configuration server deployed in the edge network 406 to offer services to edge enabler client 412 to discover the appropriate EES 416 and edge application servers 414. The ECS 408 provides supporting functions needed for the edge enabler client 412 to connect with an EES 416. The ECS 408 can provision of Edge configuration information to the edge enabler client 412. The configuration information can include information for the edge enabler client 412 to connect to the EES 416 and information for establishing a connection with EESs 416. The ECS 408 can support the functionalities of registration (i.e., registration, update, and de-registration) for the EES(s) 416.

The application client 410 is a client at the UE 402 (e.g., an app) that the service provider requires the users to have to use the service. The application client 410 is the application resident in the UE 402 performing client function(s).

The edge enabler client 412 is a client at the UE 402 that interfaces with services deployed at the mobile operator edge to provide required data to the application client 410. The edge enabler client 412 abstracts the delivery of data to the application client 410, so the application client 410 does not know whether the data is being retrieved through edge network 406, core network 404, or service provider network. The edge enabler client 412 can retrieve and provision configuration information to enable the exchange of application data traffic with the edge application server 414.

The edge application server 414 is an application server deployed in the edge network 406 for the mobile operator. The edge application server 414 is the application service resident in the edge network 406, performing the server functions. The application client 410 of UE 402 can connect to the edge application server 414 in order to avail the services of the application with the benefits of edge computing.

The EES 416 provides supporting functions to enable exchange of traffic between edge enabler client 412 and edge application server 414. Such functions include discovery of edge application server 414, connection management between edge enabler client 412, ECS 408, and edge application servers 414.

The EES 416 can provision configuration information to the edge enabler client 412, enabling exchange of application data traffic with the edge application server 414. The EES 416 can interact with 3GPP core network 404 for accessing the capabilities of network functions. The EES 416 can support external exposure of 3GPP network and service capabilities to the edge application server(s) 414; support functionalities of registration (i.e., registration, update, and de-registration) for the edge enabler client(s) 412 and the edge application server(s) 414; and support the functionalities of triggering the edge application server 414 instantiation on demand.

Although FIG. 4 illustrates an edge application architecture 400 for enabling edge application, various changes may be made to FIG. 4. For example, the edge application architecture 400 and its individual components can vary as needed or desired. Also, the number and placement of various components of the edge application architecture 400 can vary as needed or desired. In addition, the edge application architecture 400 may be used in any other suitable volumetric conferencing process and is not limited to the specific processes described above.

Figure 5:
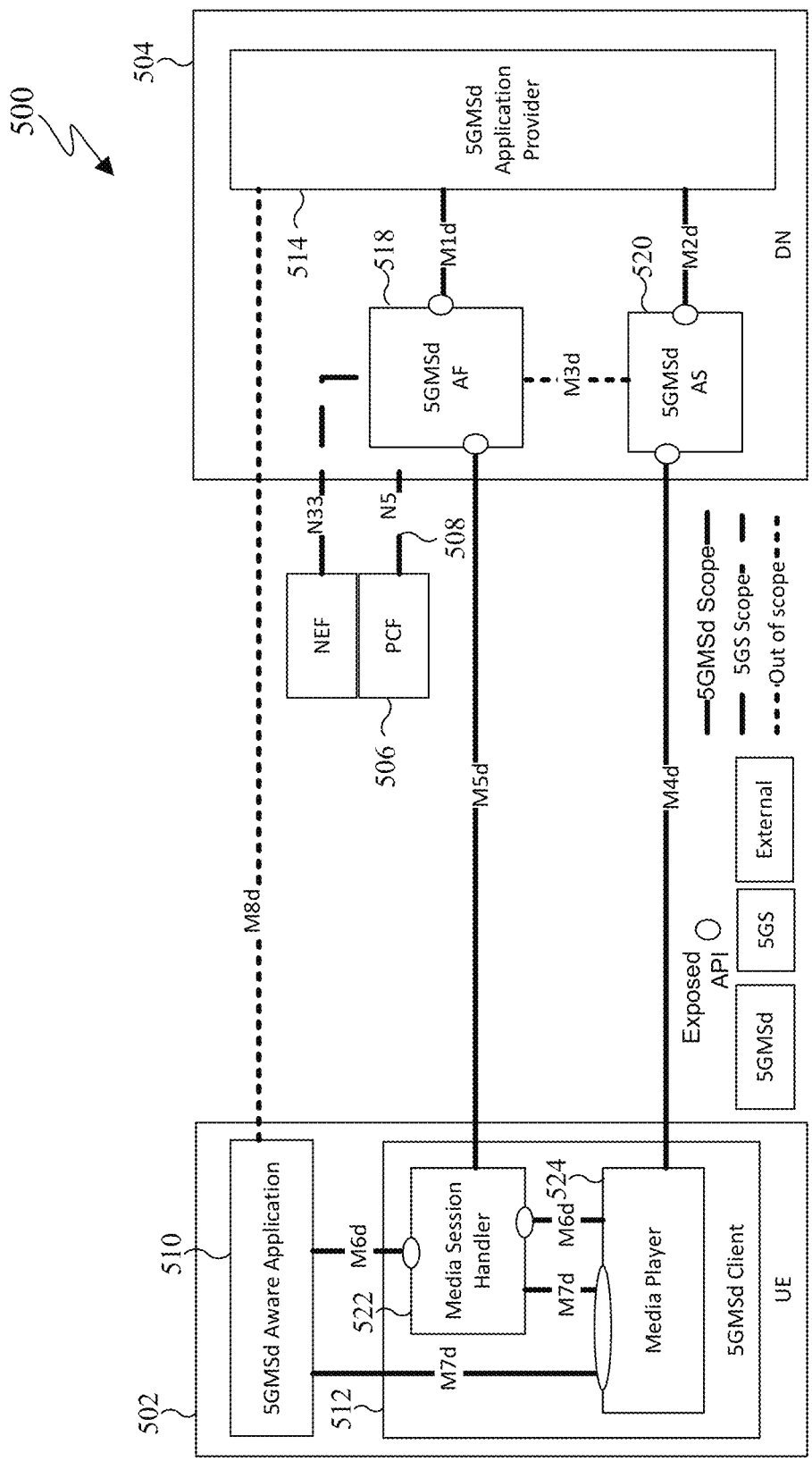
FIG. 5 illustrates an example architecture for media streaming in accordance with this disclosure.

FIG. 5 illustrates an example architecture 500 for media streaming in accordance with this disclosure. The embodiment of the media streaming architecture 500 illustrated in FIG. 5 is for illustration only. FIG. 5 does not limit the scope of this disclosure to any particular implementation of an electronic device.

5G media streaming is enabled by setting up application functions in a core network 504. A signaling application function server 518 that performs signaling function(s) and a media application function server 520 that performs media functions. There can be multiple instances of these application functions the core network 504 depending upon application requirements. Different components of UE 502 connect to these application functions to exchange signaling and media data to receive a 4G media streaming service offered by the mobile operator.

As shown in FIG. 5, 3GPP TS 26.512 specifies reference for media streaming architecture 500 for 5G media streaming (5GMS). 3GPP SA working group 4 (SA4) is standardizing media services for deployment in a 5G network. Different system components for 5G media streaming architecture 500 can include a UE 502 and a data network 504. The UE 502 can include an aware application 510, and an edge enabler client 512 (5GMSd client). The data network 504 can include an application provider 514 (5GMSd application provider), a signaling application function server 518 (5GMSd AF), and a processing media application function server (5GMSd) 520. The 5GMSd client 512 can include a media session handler 522 and a media player 524. The 5GMSd client 512 can correspond to the edge enabler client 512 shown in FIG. 5.

The aware application 510 is stored in the UE 502. The aware application 510 receives application service information from the application provider. The application service information is then used for retrieving information and data related to that application from the data network. The aware application 510 can correspond to the application client 410 shown in FIG. 4.

The signaling application function server 518 is a function in a data network 504 that performs signaling functions of the application service. The signaling application function server 518 provides various control functions to the media session handler on the UE 502 and/or the 5GMSd application provider. The signaling application function server 518 may relay or initiate a request for different policy or charging function (PCF) 506 treatment or interact with other network functions.

The media application function server 520 is an application server that hosts media functions. The media application function server 520 is dedicated to media streaming. The media application function server 520 can stream volumetric media to the UE 502.

The media session handler 522 is a component of the UE 502 that enables communication with signaling application function server 518 in the data network 504. The communications with the signaling application function server 518 are for setting up the relevant media channels between the UE 502 and the data network 504.

The media player 524 is a component of the UE 502. The media player 524 can receive media data from the media application function in the data network 504. The media player 524 can provide data to the 5GMSd aware application 510.

Although FIG. 5 illustrates a media streaming architecture 500, various changes may be made to FIG. 5. For example, the media streaming architecture 500 and its individual components can vary as needed or desired. Also, the number and placement of various components of the media streaming architecture 500 can vary as needed or desired. In addition, the media streaming architecture 500 may be used in any other suitable media streaming process and is not limited to the specific processes described above.

Figure 6:
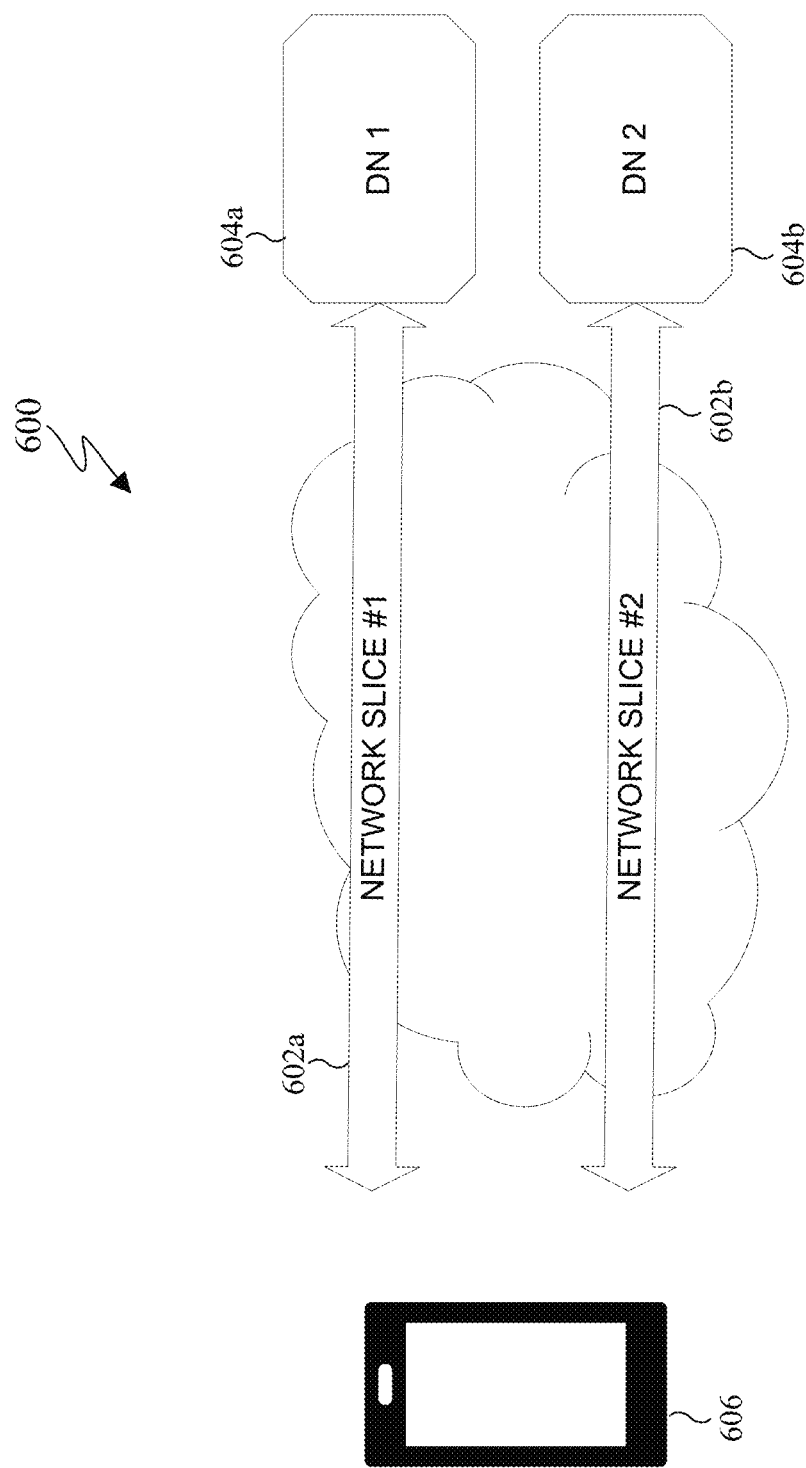
FIG. 6 illustrates an example media communication service with two network slices in accordance with this disclosure.

FIG. 6 illustrates an example media communication service 600 with two network slices 602 in accordance with this disclosure. The embodiment of the media communication service 600 illustrated in FIG. 6 is for illustration only. FIG. 6 does not limit the scope of this disclosure to any particular implementation of an electronic device.

As shown in FIG. 6, an example media communication service using two network slices 602. A first network slice 602a can connect to a first data network 604a (e.g., the 5G IMS data network) for volumetric conversational service. A second network slice 602b can connect to a different, second data network 604b, e.g., for downloading content using 5G Media Streaming as defined in 3GPP TS 26.501 and 3GPP TS 26.502. An application in the UE 606 may use these two network slices 602 based on implementation of the application running on the UE 606. In this case, the UE application is responsible for utilizing two separate network slice connections, and then bridge (or utilize) the content retrieved using two different network slices 602. However, since the support for network slicing is not natively available from the network to the UE 606, it is entirely possible that there is a synchronization issue with content retrieved using the two different network slices 602. For example, two UEs 606 are communicating with each other using the first network slice 602a (volumetric conversational service). As part of the interaction, the UEs 606 can agree on viewing some content together (e.g., some 2D/3D video content, images, shared collaboration etc.) for which they use the second network slice 602b to retrieve the content. It is possible that since the two services are not synchronized, the content the two users are trying to retrieve using the second network slice 602b are not available in time. This can happen because of a) different quality parameters attributed to the second network slice 602b compared to the first network slice 602a and the second network slice 602b) network issues. In certain embodiments, the UE 606 can negotiate similar QoS to both of the network slices 602 so some of the problems can be alleviated. However, it is still possible that the UE initiated method of synchronizing content does not go as expected. The UE can be represented by the client device 106-116 shown in FIG. 1 and the electronic device 300 shown in FIG. 3.

In above case, there is no support of the network to help synchronization of content across both network slices 602. The following network support can be added to facilitate seamless experience of hybrid and media communication services.

Network slice identifiers can be carried in signaling messages of other network slices 602 when setting up media communication services. When the first network slice 602a is setup, and the UE 606 and network agree on a network slice identifier (e.g., S-NSSAI of the first network slice 602a), then while setting up the second network slice 602b, the UE 606 can include the slice identifier of the first network slice 602a in the signaling connection for setting up the media communication using the second network slice 602b (e.g., using a "component slices" field). Similarly, once the second network slice 602b is setup, the first network slice 602a is updated with the slice identifier of the second network slice 602b so the control plane nodes of the first network slice 602a are aware that a corresponding network slice 602 (with slice identifier of the second network slice 602b) is setup.

In addition, to have the control plane nodes of all network slices 602 aware of other network slices 602 for the media communication/hybrid service, a "Media-communication-Service-Id" field can be included in all media service connection setup requests for each of the network slices 602 utilized for that media communication service. FIG. 6 shows the above steps and different signaling message fields for setting up media communication service with two network slices 602.

FIG. 6 is an example for a media communication service with two network slices 602, which can be expanded to a media communication service with any number of network slices 602. For a media communication service with "N" network slice 602, the UE 606 can perform similar action, i.e., for each subsequent connection request for the media communication service utilizing another network slice 602, the UE 606 can include a list of slice identifiers of all network slices 602 that have already been setup for the media communication service. Additionally, for each setup request for the media communication service utilizing a new network slice, the UE 606 can update already setup network slices 602 with the slice identifier of the newly setup network slice 602. In certain embodiments, when the UE 606 decides that a network slice 602 is not needed any more for the media communication service, the UE 606 can terminate the network slice 602 that is not needed, and then updates every other network slice 602 that a network slice 602 with a given slice identifier has been terminated.

The 5G AF in each network slice 602 that is responsible for serving the UE 606 is made aware of other network slices 602 in the media communication service as defined above. Once all the AFs in all the connected network slices 602 are made aware of other network slice identifiers then a common QoS and quality of experience (QoE) framework can be implemented.

Media services can be provisioned using network slicing when the media service is expected to have multiple media streams (e.g., audio, video, text, control etc.) that may require different QoS treatment during the service delivery stage.

Many such media services are being discussed in different 3GPP groups that may benefit with setting up those services with multiple network slices. Examples of such media services are specified in 3GPP SA WG1 TR 22.847. This disclosure provides stage 1 use cases and potential 5G requirements on supporting tactile and multi-modal communication services. Specifically, aspects such as study of new scenarios, use cases and potential requirements for immersive real time experience involving tactile and multi-modal interactions (including network assistance for coordination, charging and security aspects, key performance indicators (KPIs)), and gap analysis is included in the scope of this technical specification. As part of this disclosure, multiple use cases for tactile and multi-modal communication are included. Among these use cases include use cases related to media that are a strong candidate for realization using network slicing.

Examples of use cases include immersive multi-modal virtual reality applications and immersive virtual reality games. Both of the use cases can require multiple multi-modal media streams between the user and the 5G network. For example, the use cases can be realized by running the audio and video streams for HMD devices in a first network slice 602a and the haptic content from sensing devices such as gloves in a second network slice 602b. Since the use case description mentions differential QoS treatment for above media streams, QoS can be provisioned differently for different network slices 602 carrying content of different modality.

A consideration while using network slicing for media services is that different component streams of the media services (audio, video, tactile etc.) can be delivered to the UE 606 using different network slices 602. Since the QoS for different network slices 602 are configured differently by the mobile operator, the application service provider can take advantage of the difference in quality settings of different network slices 602 to delivery content to the UE 606 with different levels of QoS requirements. An example, such delivery option could be using an 3GPP standardized eMBB slice for delivering video content and 3GPP standardized uRLLC slice for delivering tactile data.

Although FIG. 6 illustrates a media communication service 600, various changes may be made to FIG. 6. For example, the number and placement of various components of the media communication service 600 can vary as needed or desired. In addition, the media communication service 600 may be used in any other suitable network slicing process and is not limited to the specific processes described above.

Stream synchronization can be an issue when different media component streams are delivered using different network slices 602. Tactile data is delivered more frequently and in smaller messages while video data may be delivered with a comparatively longer packet duration and larger packet size. In this context, tactile and video data delivered using different network slices 602 may arrive at the UE 606 at different times. These packets need to be buffered at the UE 606, decoded by the UE 606 based on the decoding offsets, and then composed into presentation views based on presentation offset and finally rendered to the user. While buffering may work to a certain extent (e.g., out of order packets of different component streams etc.), buffering may not be feasible if packets from different component streams arrive with a relatively large jitter, packet delays, etc. The amount of buffer available at the UE 606 may not be enough to correctly collect the to-be-presented packets of all media component streams, decode, and present them to the user. In this case, there is a necessity of network supported stream synchronization facilities that help the UE 606 can receive packets of different component streams to be properly decoded and presented in time to the application user.

Figure 7:
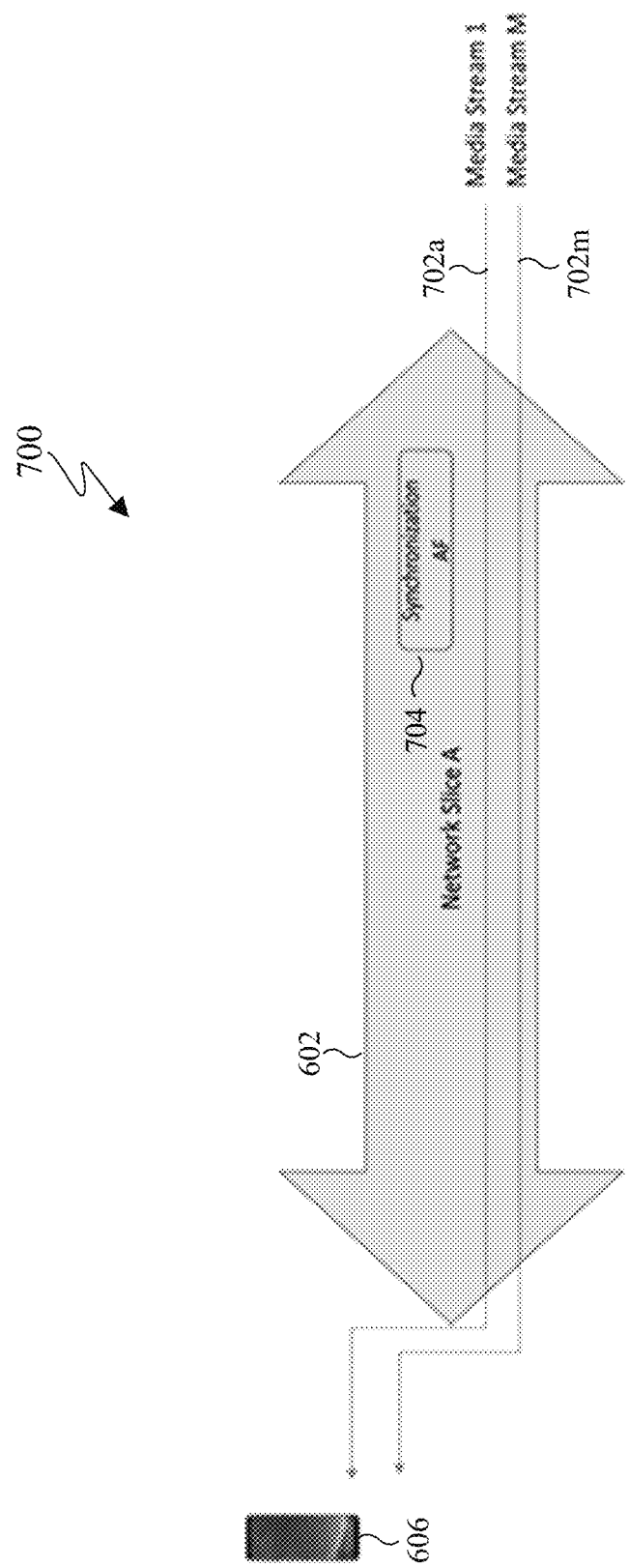
FIG. 7 illustrates an example intra-slice synchronization in accordance with this disclosure.

FIG. 7 illustrates an example intra-slice synchronization 700 in accordance with this disclosure. The embodiment of the intra-slice synchronization 700 illustrated in FIG. 7 is for illustration only. FIG. 7 does not limit the scope of this disclosure to any particular implementation of an electronic device.

As shown in FIG. 7, intra-slice synchronization 700 can use stream lookup functions in different network slices 602. Each network slice 602 can be provisioned with a stream information lookup function or synchronization function 704 (e.g., a 5G application server acting as slice-specific synchronization function) that can look up stream information of component streams 702 going through that network slice 602. The synchronization function 704 can be represented by the server 200 shown in FIG. 2.

If more than one component stream 702 is delivered through the same network slice 602, then the synchronization function 704 has the capability to individually lookup decoding and presentation offsets of different media component packets, streams, and frames. With this information, the synchronization function 704 can then make sure that different media component streams 702*a* and 702*m* within that network slice 602 are properly delivered to the UE 606.

The synchronization function 704 can look at the properties of the component stream 702 (inter-packet delay, packet size, jitter etc.) and, based on the decoding offset from the parent packet or frame, deliver those packets and frames based on those offsets. Even if the packets or frames of different component streams 702*a* and 702*m* arrive with some network artifacts (e.g., out of order/delayed/arrived with jitter etc.) from the source, then the synchronization function 704 can correct those network artifacts and forward the component streams 702*a* and 702*m* in a proper order according to the stream or frame requirement. To facilitate corrected network artifacts and forwarded component streams, the synchronization function 704 can build corrected stream transmission condition information for each stream parameter according to the information in TABLE 1.

TABLE 1

| Stream transmission condition information | | |
|---|---|---|
| Stream Id | Parameter | Adjustment (+ve/−ve) in absolute or percentage value |
| Stream Id 1 | Packet delay | |
| | Inter-packet delay | |
| | ... | |
| | ... | |
| Stream id 2 | ... | |
| ... | | |

For each stream parameter, the synchronization function 704 can determine the necessary adjustment needed for proper delivery of that stream 702 so the stream packets or frames can be properly decoded and presented at the UE 606. In addition, such adjustment information is generated for each media component stream 702 going through that network slice 602.

Packets or frames of different component streams 702*a* and 702*m* arriving from the synchronization function 704 can have minimal, if any, of packet or frames of different media component streams 702*a* and 702*m* and can be properly decoded and presented to the application user.

Although FIG. 7 illustrates an example intra-slice synchronization 700, various changes may be made to FIG. 7. For example, the number and placement of various components of the intra-slice synchronization 700 can vary as needed or desired. In addition, the intra-slice synchronization 700 may be used in any other suitable network slicing process and is not limited to the specific processes described above.

Figure 8:
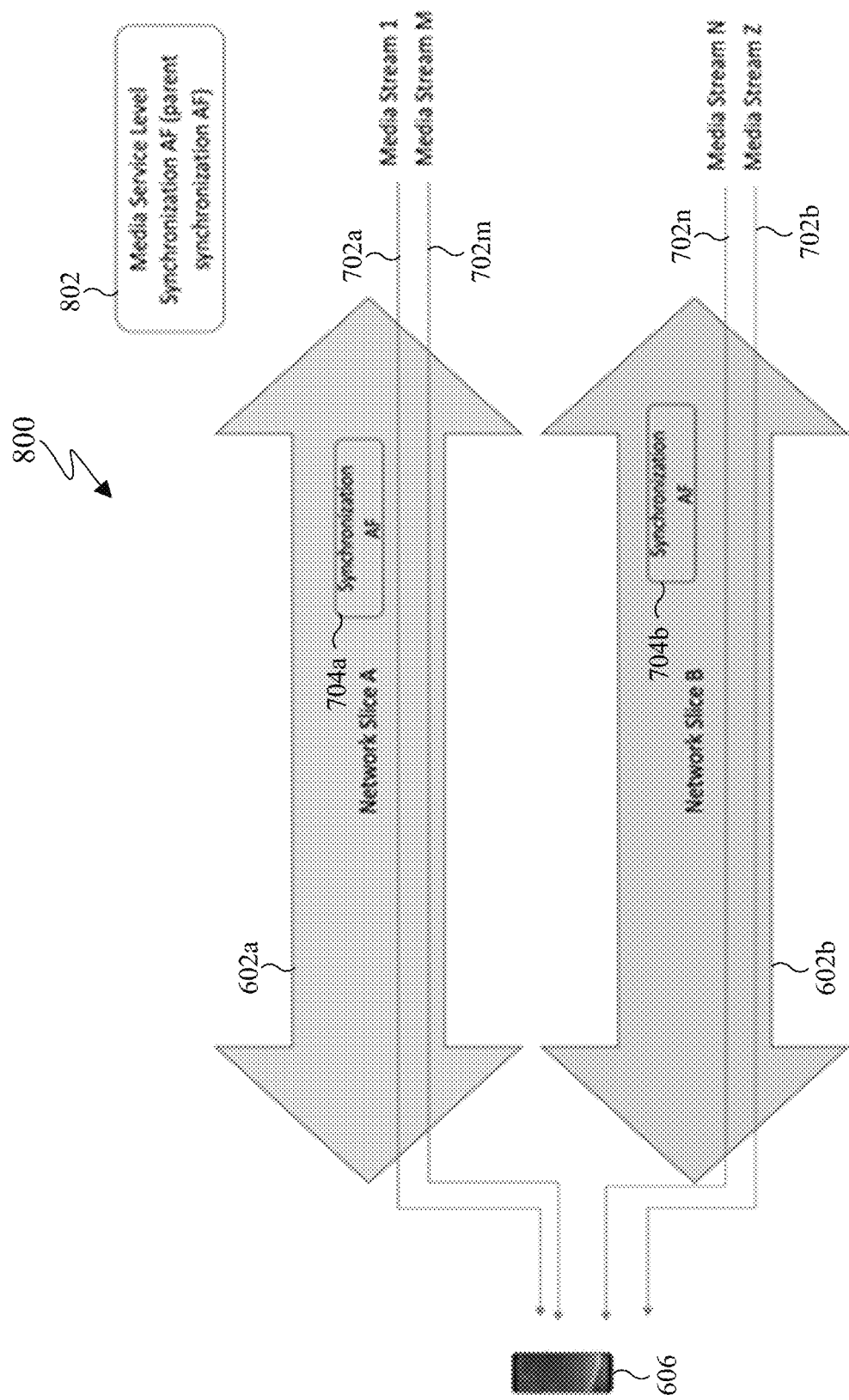
FIG. 8 illustrates an example inter-slice synchronization in accordance with this disclosure.

FIG. 8 illustrates an example inter-slice synchronization 800 in accordance with this disclosure. The embodiment of the inter-slice synchronization 800 illustrated in FIG. 8 is for illustration only. FIG. 8 does not limit the scope of this disclosure to any particular implementation of an electronic device.

As shown in FIG. 8, to facilitate inter-slice synchronization 800 of component streams 702*a*, 702*b*, 702*m*, and 702*n* delivered across multiple network slices 602*a* and 602*b*, the synchronization functions 704*a* and 704*b* of one of the network slices 602*a* and 602*b* can act as the parent synchronization function 802 (i.e., media service level synchronization function) to look at the media component stream information delivered in all network slices 602*a* and 602*b*. The parent synchronization function 802 can be represented by the server 200 shown in FIG. 2.

The parent synchronization function 802 can be responsible for synchronization of all media component streams 702*a*, 702*b*, 702*m*, and 702*n* of all network slices 602*a* and 602*b*. This responsibility can be achieved in the following two options.

Each individual synchronization function 704a and 704b in a network slice 602a and 602b can forward representative packets or frames (from the media component streams 702a, 702b, 702m, and 702n managed by the synchronization function 704a and 704b) to the parent synchronization function 802. The parent synchronization function 802 may not need look at each and every packet or frame of each and every media component streams 702a, 702b, 702m, and 702n in all network slices 602a and 602b. Based on the representative set of packets or frames of different media components streams 702a, 702b, 702m, and 702n in all network slices 602a and 602b, the parent synchronization function 802 can follow the same procedure for determining the proper stream transmission condition information as described in the case of inter-slice synchronization 800 earlier. Once this stream transmission condition information is determined for all media component streams 702a, 702b, 702m, and 702n in all network slices 602a and 602b, the parent synchronization function 802 can forward the information about relevant media component streams 702a, 702b, 702m, and 702n to respective stream synchronization functions 704a and 704b of individual network slices 602a and 602b. When the individual slice specific synchronization functions 704a and 704b receive the information from the parent synchronization function 802, each individual synchronization function 704a and 704b can forward the respective media component streams 702a, 702b, 702m, and 702n or frames in a respective network slice 602a and 602b according to the suggested information as described in the case of intra-slice synchronization 700.

Instead of forwarding representative packets or frames of all media component streams 702a, 702b, 702m, and 702n within a network slice 602a and 602b to the parent synchronization function 802, i.e., media level synchronization function, the slice-specific synchronization functions 704a and 704b can build a stream parameter status table as shown in TABLE 2.

TABLE 2

Stream parameter status

| Stream Id | Parameter | Current status |
|---|---|---|
| Stream Id 1 | Packet delay | |
| | Inter-packet delay | |
| | . . . | |
| | . . . | |
| Stream id 2 | . . . | |
| . . . | | |

For each media component stream 702a, 702b, 702m, and 702n in the network slice 602a and 602b, the slice-specific synchronization function 704a and 704b can build a current status information for all applicable parameters and share this information with the parent synchronization function 802. Based on this information, the parent synchronization function 802 can build the stream transmission condition information as described earlier in the case of inter-slice synchronization 800. Once this stream transmission information is generated, the parent synchronization function 802, i.e., media service level synchronization function, can follow the same procedure as described above.

To allow for intra-slice synchronization 700 or inter-slice synchronization 800, a reference clock can be used to compare against the decoding offsets, presentation offsets, and timing based parameters. To allow for such reference, each slice-specific synchronization function 704a and 704b and the media service level parent synchronization function 802 can be configured with a reference clock, e.g., a network time protocol (NTP) server. All the synchronization functions 704a, 704b, and 802 at all levels can use this reference clock to make decisions for building stream transmission condition information and stream parameter tables.

If different media service component streams are delivered through different network slices without adequate network support, then the UE 606 may run the risk of not having a correct packets or frames for presentation to the application user. If the QoS delivery parameters of different network slices 602a and 602b are not properly aligned (either due to improper slice configuration or slice parameter change during the course of session), then the packets or frames of different media components streams 702a, 702b, 702m, and 702n delivered through different network slices 602a and 602b can arrive at the UE 606 at different times, which can render buffering mechanisms useless at the UE 606. Even if the application configures large application buffers, those buffers sometimes may not be useful because the synchronization mechanisms in place cannot perform the required media component packaging to facilitate complete application experience to the user. To allow for better synchronization at the UE 606 in these circumstances, the network can be queried for synchronization information. The following is a procedure and architectural enhancements to support this synchronization.

The UE 606 can request synchronization information from each of the slice-specific synchronization functions 704a and 704b. When such a request comes in from the UE 606, the slice-specific synchronization function 704a and 704b can provide the stream parameter status table information for that network slice 602a and 602b. However, since the stream parameter status table described earlier has the current stream parameter status information, such information can be enhanced with timing information shown in TABLE 3.

TABLE 3

Stream parameter status with time

| Time | Status information |
|---|---|
| $T_0$ | Stream parameter status table information described earlier for all streams at time $T_0$ |
| $T_1$ | Stream parameter status table information described earlier for all streams at time $T_1$ |
| $T_2$ | . . . |
| . . . | . . . |
| . . . | . . . |
| $T_N$ | . . . |

When the UE 606 requests synchronization information, the UE 606 can request information at a specific time "t" and the slice-specific synchronization function 704a and 704b can return such information at that time "t". In certain embodiments, the UE 606 can request for all information, i.e., for all times, and when the UE 606 receives a response, the relevant information can be extracted. When the UE 606 knows that the decoding and presentation were acceptable at a specific time "t", the values of different parameters at that time versus the current values allow the UE 606 to determine how the parameters have moved or transformed. With such transformation information, the UE 606 can estimate the buffer sizes required to hold different media service components' packets/frames.

Similar to slice-specific synchronization function, the UE 606 can request the media service level parent synchronization function 802 similarly for status information for all network slices 602a and 602b. The parent synchronization function 802 can deliver similar information as the slice-specific synchronization function 704a and 704b as described earlier with timing information, but for all media component streams 702a, 702b, 702m, and 702n in all network slices 602a and 602n.

Although FIG. 8 illustrates an inter-slice synchronization 800, various changes may be made to FIG. 8. For example, the number and placement of various components of the inter-slice synchronization 800 can vary as needed or desired. In addition, the inter-slice synchronization 800 may be used in any other suitable network slicing process and is not limited to the specific processes described above.

Figure 9:
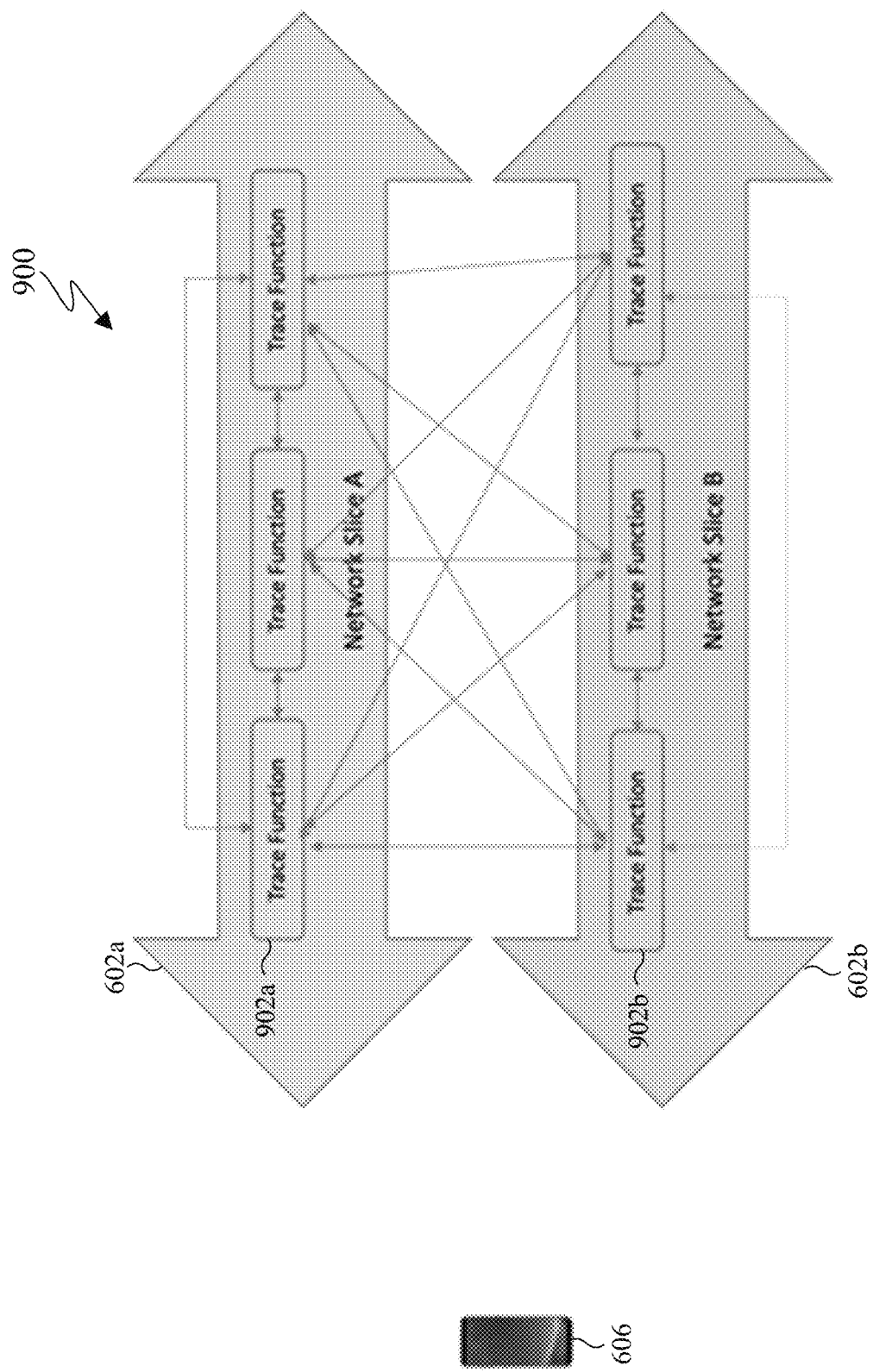
FIG. 9 illustrates an example multi-slice collaboration for tracing media stream delivery status in accordance with this disclosure.

FIG. 9 illustrates an example multi-slice collaboration 900 for tracing media stream delivery status in accordance with this disclosure. The embodiment of the multi-slice collaboration 900 illustrated in FIG. 9 is for illustration only. FIG. 9 does not limit the scope of this disclosure to any particular implementation of an electronic device.

As shown in FIG. 9, the multi-slice collaboration 900 allows for exchanging synchronization information. When there are multiple slices 602a and 602b in use for delivery of streams of a media service, then all the slices 602a and 602b can collaborate to exchange synchronization information.

A set of trace functions 902a and 902b can be setup in all of the network slices 602a and 602b. Each trace function 902a and 902b in each network slice 602a and 602b can communicate with every other trace function 902a and 902b in every network slice 602a and 602b to exchange synchronization information. Such synchronization information includes details such as the information shown in TABLE 4.

TABLE 4

Synchronization information exchanged between
Trace functions in different network slices

| Slice number | Stream Id | Parameter | Time instance |
|---|---|---|---|
| Slice 1 | Stream Id 1 | Packet ctr/frame ctr<br>Delay<br>Bandwidth<br>Throughput<br>Packet loss ratio<br>Jitter<br>. . .<br>. . . | |
| | Stream id 2<br>. . . | . . . | |
| Slice 2 | . . .<br>. . . | | |

For each media component stream going through a network slice 602a and 602b, the trace function 902a and 902b can log details such as the packet counter (packet number) or the frame counter (frame number) along with the time instance (e.g., pass-through time) when that packet/frame was delivered through that network slice 602a and 602b. For other parameters such as delay, bandwidth, throughput, packet loss ratio, jitter etc., the average or median values can be stored along with the time they were computed. When such information is exchanged between different trace functions 902a and 902b in each network slice 602a and 602b, then all network slices 602a and 602b can have information about when each packet, frame counter, or number were transferred through a given network slice 602a and 602b or the values corresponding to additional parameters.

When each trace function 902a and 902b has the above information, then each network slice 602a and 602b knows a relative time for transferring a packet or frame number for a media component stream in relation to another media component stream in another network slice 602a and 602b. However, to translate this information to actionable information, the application service provider has to indicate the probable inter-relation timing information between all media component streams. To facilitate exchange of this information, the application service provider configures inter-stream timing relation information as shown in TABLE 5.

TABLE 5

Inter stream timing relation information

| Slice number | Time Interval | Stream comp. 1 | Stream comp. 2 | Stream . . . Comp. N |
|---|---|---|---|---|
| Slice 1 | 0-M msec | "a" packets/ frames<br>"e" bitrate<br>"h" bandwidth<br>"k" packet loss ratio<br>"q" jitter<br>"t" throughput | "b" packets/ frames<br>"f" bitrate<br>"i" bandwidth<br>"l" packet loss ratio<br>"r" jitter<br>"u" throughput | . . . "x" packets/ frames<br>"g" bitrate<br>"j" bandwidth<br>"p" packet loss ratio<br>"s" jitter<br>"v" throughput |
| | M-2M msec<br>. . . | . . .<br>. . . | . . . | . . . |
| Slice 2<br>. . . | | | | |

For each network slice 602a and 602b, for an interval period (e.g., 0-M msec for any m e.g., 1000 msec), TABLE 5 shows the probable delivery of packets/frames, bitrate, bandwidth, allowed packet loss ratio, jitter, and throughput through that slice. Based on the above configuration information, each trace function 902a and 902b knows when each network slice 602a and 602b has to transmit a packet or frame belonging to a stream relative to other stream components within the same network slice 602a and 602b. The information in TABLE 5 provided by the application service provider and the status information shown in TABLE 4 can allow each trace function 902a and 902b to know when to transfer the packet or frame of each stream relative to other streams in the network slice 602a and 602b.

As a result of the exchange of above information between different trace functions 902a and 902b in different network slices 602a and 602b, each trace function 902a and 902b knows the relative delivery information of a stream component in relation to other stream components in the network slice 602a and 602b. As a result, the trace function 902a and 902b can apply packet or frame forwarding actions for each packet or frame belonging to each stream in the network slice 602a and 602b.

An action can include a positive or negative delay to the stream. The positive or negative delay action can be chosen by the trace function 902a and 902b if the available information indicates that the stream packets or frames are delivered earlier or later than required. Applying the positive or negative delay action can delay or fasten a delivery of the packets or frames belonging to the stream by a certain value. The amount of time to delay or fasten is based on the difference between the timing information between the respective stream components of TABLE 5 for the delay parameter.

Another action can include a positive or negative offset to bitrate to the stream. The positive or negative offset to bitrate action can be chosen by a trace function 902*a* and 902*b* if the available information indicates that the stream packets or frames are delivered with a lower or higher bitrate than required. Applying the positive or negative offset to bitrate action can increase or decrease a delivery bitrate of the packets or frames belonging to the stream by a certain offset value. The amount of bitrate to increase or reduce can be based on a difference between bitrate parameter values of the respective stream components of TABLE 5.

One action can include a positive or negative offset to throughput to the stream. The positive or negative offset to throughput action can be chosen by the trace function 902*a* and 902*b* if the available information indicates that the stream packets or frames are delivered with a lower or higher throughput than required. Applying the positive or negative offset to throughput action can increase or decrease the delivery throughput of the packets or frames belonging to the stream by a certain offset value. The amount of throughput to increase or reduce is based on a difference between the throughput parameter values of the respective stream components of TABLE 5.

Another action can include a positive or negative offset to jitter of the component stream: The positive or negative offset to jitter action can be chosen by the trace function 902*a* and 902*b* if the available information indicates that the stream packets or frames are delivered with a lower or higher jitter than allowed. Applying the positive or negative offset to jitter action can increase or decrease the allowed delivery jitter of the packets or frames belonging to the stream by a certain offset value. The amount of jitter to increase or reduce is based on the difference between the jitter parameter values of the respective stream components of TABLE 5.

Another action can include a positive or negative offset to packet loss ratio. The positive or negative offset to packet loss ratio action has similar behavior as the positive or negative offset to jitter action behavior described above, but the uses the packet loss ratio values.

Another can include a positive or negative offset to bandwidth. The positive or negative offset to bandwidth action has similar behavior as for the throughput behavior described above, but the comparison uses the bandwidth values.

Various aspects described above in the disclosure can be configured by the application service provider at a control function in MNO network, e.g., a 5G AF that is responsible for managing multiple network slices. Below is the information that the application service provider can provision as part of the service provisioning procedure to setup the media service to be delivered using multiple network slices as shown in TABLE 6.

TABLE 6

| Service configuration by application provider to facilitate stream synchronization | |
|---|---|
| Field | Description |
| Parameter list for building stream adjustment information | List of parameters for which the synchronization function has to build the stream transmission condition information as described earlier in the disclosure. Such parameters could be any of: Delay/latency Throughput Bandwidth Packet loss ratio Jitter Etc. When the application service provider provides this list of parameters, such information is conveyed to each synchronization function of every network slice as part of the media service. |
| Inter-slice-synchronization option | Option that has to be followed for generating inter-slice synchronization information. Following are the allowed values: "representative" packets/streams: With this option, a representative set of packets/frames of all component streams within a network slice are sent by the slice-specific synchronization function to the parent media service level synchronization function. Stream parameter status: With this option, each slice-specific synchronization function will build the stream parameter status table as described earlier in the disclosure and will share with parent synchronization function i.e., media level synchronization function. |
| Synchronization-priority | Priority of synchronization tasks for the media service. Possible values are: Slice-specific: Intra-slice synchronization processes take precedence. Service-level: Inter-slice synchronization processes take precedence |
| Expected-relative-stream-condition-information | Information regarding the expected stream condition information. This information is provided for each stream in the media service. Such information includes the relative difference for each parameter compared to the same parameter in the reference stream |
| Allow-UE-to-receive-stream-status | Boolean variable indicating whether UE can request stream status information with timing information. Possible values: True: UE can request stream status with timing information so it can estimate UE application buffers and make them available. |

TABLE 6-continued

Service configuration by application provider to facilitate stream synchronization

| Field | Description |
|---|---|
| | If this option is configured by the application service provider, the slice-specific synchronization function and the parent media service level synchronization functions can expect to receive UE requests and those functions will have to provide required information.<br>False: UE cannot request stream status with timing information |
| Inter-stream-timing-relation information | Information providing the relationship between different stream components for multiple parameters as described in Table 4 and Table 5 in the disclosure above. This information is provided for each network slice separately. |
| Trace function groups | Grouping information of Trace functions in different network slices as defined in this disclosure. Each group represents a set of Trace functions that have to interact with each other to exchange stream synchronization information as defined in TABLE 4. |
| Synchronization kickstart | Option to kickstart the synchronization between different functions described in different embodiments of this disclosure. Supported options include:<br>Marker points: Media streams in all network slices to have marker points (in packets/frames). When different functions defined in this disclosure see such marker point packets/frames, they kickstart the synchronization procedure.<br>Signaling message: 5G AF to send dedicated signaling message to all synchronization and Trace functions to kick start the synchronization process. |

Although FIG. 9 illustrates an example multi-slice collaboration 900 for tracing media stream delivery status, various changes may be made to FIG. 9. For example, the number and placement of various components of the multi-slice collaboration 900 can vary as needed or desired. In addition, the multi-slice collaboration 900 may be used in any other suitable network slicing process and is not limited to the specific processes described above.

FIGS. 10A and 10B illustrate example expected stream condition information 1000 and 1002 configured by an application service provider in accordance with this disclosure. The embodiment of the expected stream condition information 1000 and 1002 illustrated in FIGS. 10A and 10B are for illustration only. FIGS. 10A and 10B does not limit the scope of this disclosure to any particular implementation of an electronic device.

In certain embodiments for querying network for synchronization information described, the MNO network components, i.e., the slice-specific synchronization function 704a and 704n and the media service level parent synchronization function 802, assist the UE 606 with stream parameter information that the UE 606 can use to update the application buffer configuration. In certain embodiments, the application service provider 1004 can assist the UE 606 in the same task. For this to be feasible, the application service provider 1004 configures the expected relative stream condition information 1008 as shown in TABLE 7. The application service provider 1004 can be represented by the server 200 shown in FIG. 2.

TABLE 7

Expected relative stream condition information

| Stream Id | Reference stream | Parameter | Expected difference |
|---|---|---|---|
| Stream Id 1 | true | Packet delay<br>Inter-packet delay<br>. .<br>. . | |

TABLE 7-continued

Expected relative stream condition information

| Stream Id | Reference stream | Parameter | Expected difference |
|---|---|---|---|
| Stream id 2 | false | Packet delay<br>Inter-packet delay<br>. .<br>. . | |

As shown in TABLE 7, the stream for which the "reference stream" attribute is set to true has all of its parameters set to zero. For every other stream for which the "reference stream" attribute is set to false, all of the corresponding parameters are configured with a relative difference in value for the respective parameter. For example, if the inter-packet delay for stream Id 2 is set to +5 ms, then this means that the stream Id 2 should have an inter-packet delay more than 5 ms compared to the reference stream which is the stream with Stream Id 1.

All of this information is configured by the application service provider in the 5G AF that is managing the media service that can then be configured in a media level parent synchronization function 802. In certain embodiments, the application service provider 1004 can also configure individual stream level information 1010a and 1010b from TABLE 7 into the slice-specific synchronization function 704a and 704b. Once such information is available at either the media service level parent synchronization function 802 or the slice-specific synchronization functions 704a and 704n, then these functions can perform the tasks for the intra-slice synchronization 700 or inter-slice synchronization 800 described earlier in the disclosure.

As shown in FIG. 10A, a method where one or more trace functions 902a and 902b are setup in each network slice 602a and 602b, and the trace functions 902a and 902b collaborate with each other to exchange synchronization information that is then compared with the values configured by the application service provider 1004 to apply certain actions to component streams.

The trace functions 902*a* and 902*b* could be simple application services whose job is to log the information described above. In certain embodiments, the slice-specific synchronization functions 704*a* and 704*b* can perform the role of trace functions to help with multi-slice collaboration procedures.

In certain embodiments, described are various procedures for intra-slice synchronization 700, inter-slice synchronization 800, UE querying network for synchronization information, and multi-slice collaboration. These procedures describe exchanging different kind of information between different synchronization functions and trace functions.

In certain embodiments, the application service provider 1004 can provision a synchronization directory database where all this information is persisted. Each synchronization function and trace function can persist all of the information described above into this directory database. Once this information is persisted into this database, all synchronization functions and trace functions in all network slices along with the 5G AF and application service provider 1004 can have access to this directory database. As a result, each synchronization function or trace function need not individually communicate with other synchronization functions or trace functions in a same or different network slice 602*a* and 602*n*. All these functions can retrieve the necessary information from this shared directory database.

Although FIGS. 10A and 10B illustrate example expected stream condition information 1000 and 1002 configured by an application service provider, various changes may be made to FIGS. 10A and 10B. For example, the number and placement of various components of the expected stream condition information 1000 and 1002 can vary as needed or desired. In addition, the expected stream condition information 1000 and 1002 may be used in any other suitable network slicing process and is not limited to the specific processes described above.

Figure 11:
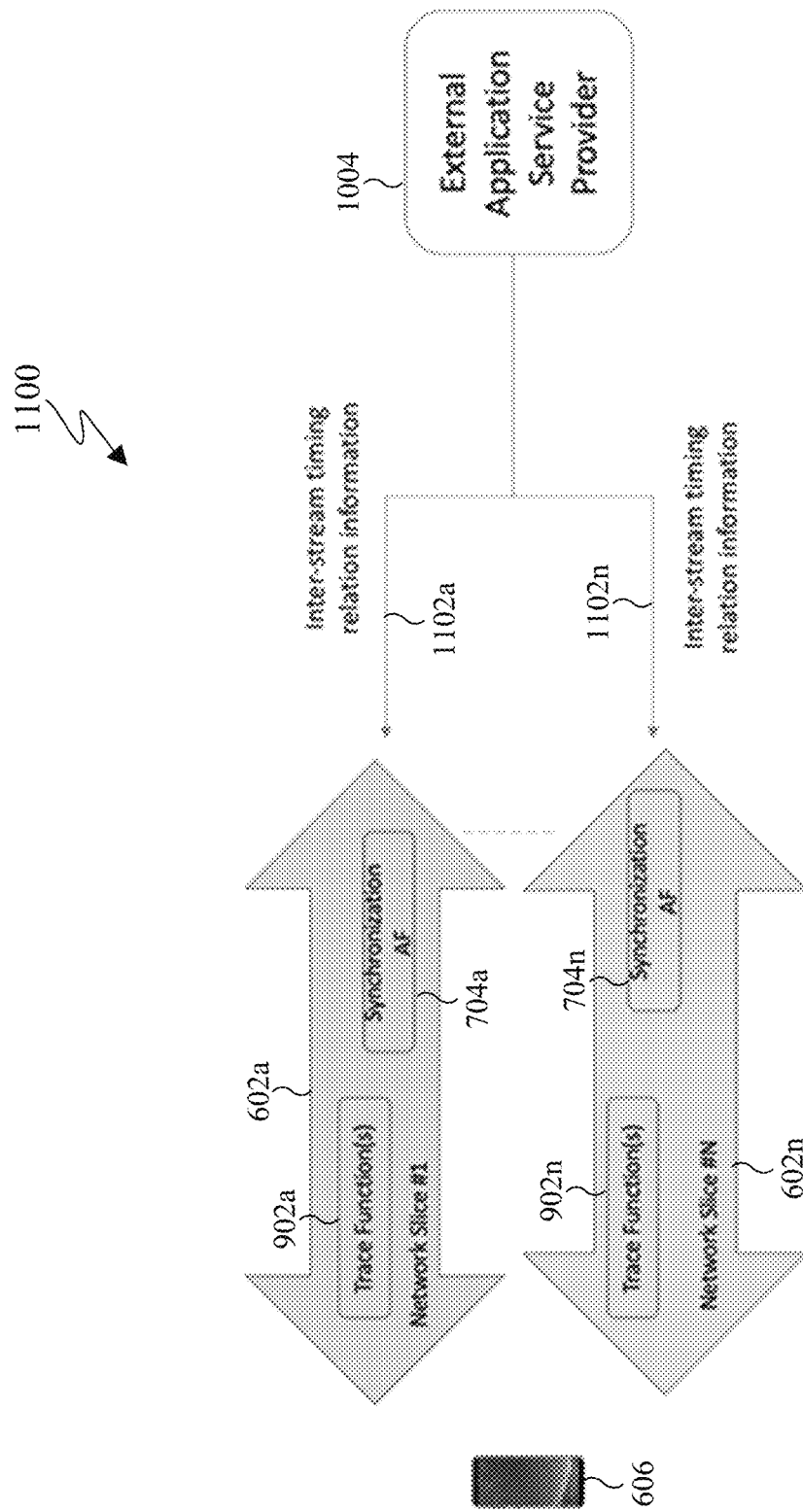
FIG. 11 illustrates an example per-slice messaging of inter-stream timing relation information in accordance with this disclosure.

FIG. 11 illustrates an example per-slice messaging 1100 of inter-stream timing relation information in accordance with this disclosure. The embodiment of the per-slice messaging 1100 illustrated in FIG. 11 is for illustration only. FIG. 11 does not limit the scope of this disclosure to any particular implementation of an electronic device.

As shown in FIG. 11, The application service provider 1004 configures inter-stream timing related information 1102*a* and 1102*n* that is used for comparing current status information by the trace functions 902*a* and 902*b* to perform some pre-determined actions. In certain embodiments, this inter-stream timing related information 1102*a* and 1102*n* is shared directly by the application service provider 1004 to each slice synchronization function 704*a* and 704*n* and each trace function 902*a* and 902*n* in every network slice 602*a* and 602*b*.

When each network slice 602*a* and 602*b* receives the inter-stream timing relation information 1102*a* and 1102*n* from the application service provider 1004, the trace functions 902*a* and 902*n* and synchronization functions 704*a* and 704*n* can use the current status information of those parameters to derive actions to perform for those media component streams. With the information provided by the application service provider 1004, each network slice 602*a* and 602*n* can adopt to changing network conditions.

Although FIG. 11 illustrates an example per-slice messaging 1100, various changes may be made to FIG. 11. For example, the number and placement of various components of the per-slice messaging 1100 can vary as needed or desired. In addition, the per-slice messaging 1100 may be used in any other suitable network slicing process and is not limited to the specific processes described above.

Figure 12:
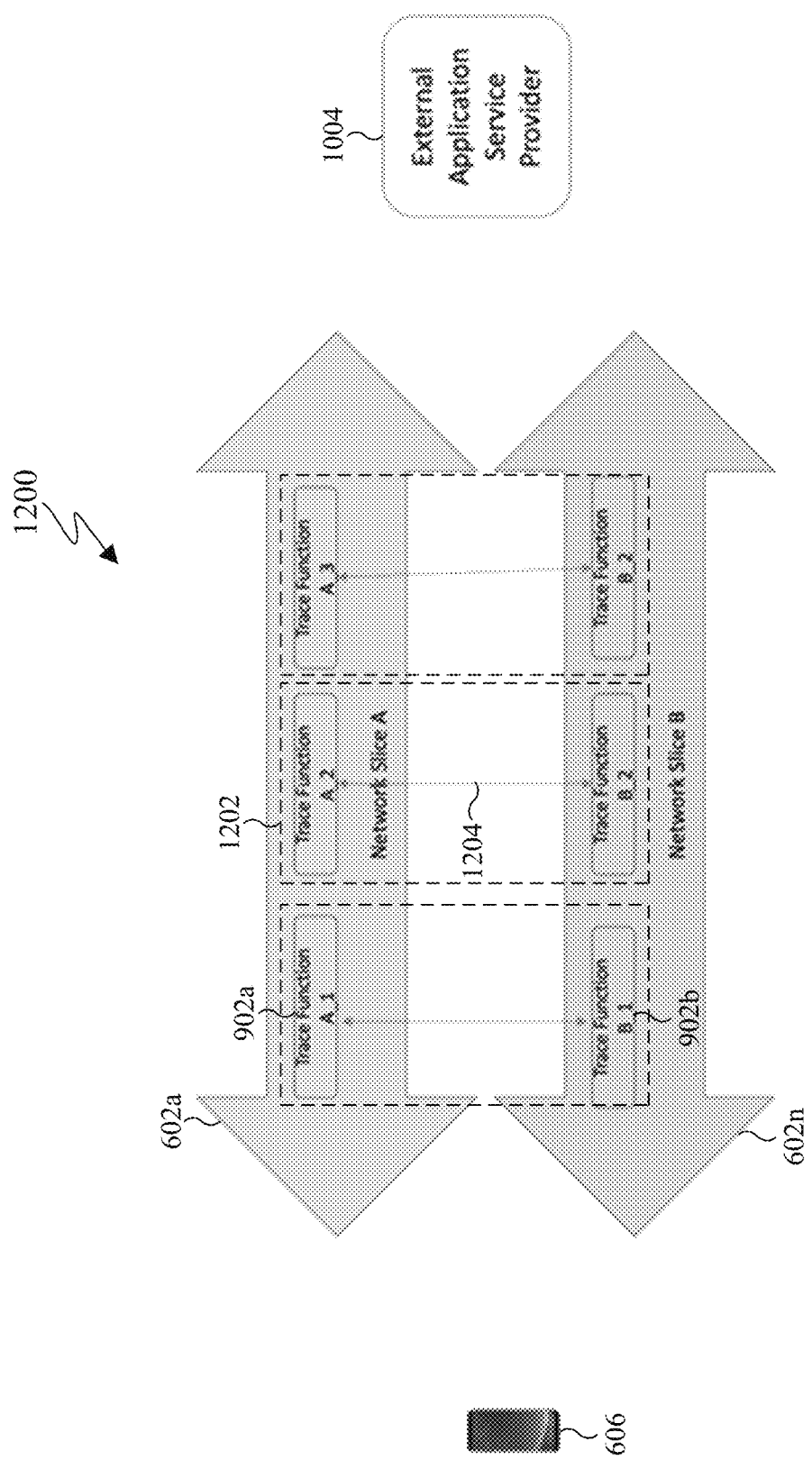
FIG. 12 illustrates example trace function groups in accordance with this disclosure.

FIG. 12 illustrates example trace function groups 1200 in accordance with this disclosure. The embodiment of the trace function groups 1200 illustrated in FIG. 12 is for illustration only. FIG. 12 does not limit the scope of this disclosure to any particular implementation of an electronic device.

As shown in FIG. 12, every trace function 902*a* and 902*n* communicates with every other trace function 902*a* and 902*n* in the same network slice 602*a* and 602*n* as well as every trace function 902*a* and 902*n* in every other network slice 602*a* and 602*n*. With this communication, these trace functions 902*a* and 902*n* exchange synchronization information of stream components going through their network slices 602*a* and 602*n*.

In certain embodiments, instead of trace functions 902*a* and 902*n* interacting with every other trace function 902*a* and 902*n* in all network slices 502*a* and 602*n*, the application service 1004 provider can define trace function groups 1202. Each trace function group 1202 can include at least one trace function 902*a* and 902*b* in each network slice 602*a* and 602*b*. Trace functions 902*a* and 902*b* within the trace function group 1202 can interact with each other to exchange synchronization information 1204 necessary for stream synchronization. In certain embodiments, the trace functions 902*a* and 902*b* within a trace function group 1202 only exchanged synchronization information with other trace functions 902*a* and 902*b* within the trace function group 1202.

The application provider 1004 has clear understanding of stream synchronization requirements, and is aware of what each media stream delivery status operates in every network slice. In other words, at any time during the media service and at different location of the network slice, the application provider 1004 has an estimate of how many packets or frames of each media stream in each network slice 602*a* and 602*b* should have been sent from the respective network slice from that location of the slice. With this understanding, the application service provider 1004 can configure trace function groups 1202 thereby signaling that the communication between trace functions 902*a* and 902*b* in each trace function group 1202 is significant for stream synchronization aspects. By defining trace function groups 1202, a more practical tracing of stream status can be performed so synchronization methods described in this disclosure can be taken advantage of.

The application service provider 1004 can deem it more practical for trace function A_1 to interact with trace function B_1 for exchanging synchronization information and group these two trace functions within the same trace function group 1202. As described above, the application service provider 1004 can group these two functions as it knows that at any instance of time, the media component streams flowing through network slice A and network slice B are to benefit by exchanging stream synchronization information. Similar grouping can be defined for other trace functions 902 in all network slices 602.

In earlier embodiments, various procedures are described where synchronization information 1204 is exchanged in between synchronization trace functions 902 of different network slices 602, and in between trace functions 902 of different network slices 602. The procedures dictate that the synchronization information 1204 is exchanged. However, continuously exchanging synchronization information 1204 between all trace functions in a network may be burdensome, i.e., time consuming, and performance intensive to use the synchronization information 1204 to enforce necessary actions.

In certain embodiments, different options are described to signal when to exchange synchronization information 1204. Marker points can be used where the application service provider 1004 can tag certain packets or frames of media streams of network slices 602. When different synchronization functions 704 and trace functions 902 defined in this disclosure receive packets or frames with these marker points, it is a signal for the above functions to exchange synchronization information 1204.

A separate signaling message (e.g., "perform synchronization") can be sent from the 5G AF to every synchronization function 704 and trace function 902 in every network slice 602. This signaling message may optionally have a time (either relative or absolute) when to start the synchronization process. The option to use for kickstarting the synchronization is configured by the application service provider during the service configuration stage.

Although FIG. 12 illustrates a trace function groups 1202, various changes may be made to FIG. 12. For example, the number and placement of various components of the trace function groups 1202 can vary as needed or desired. In addition, the trace function groups 1202 may be used in any other suitable network slicing process and is not limited to the specific processes described above.

Figure 13:
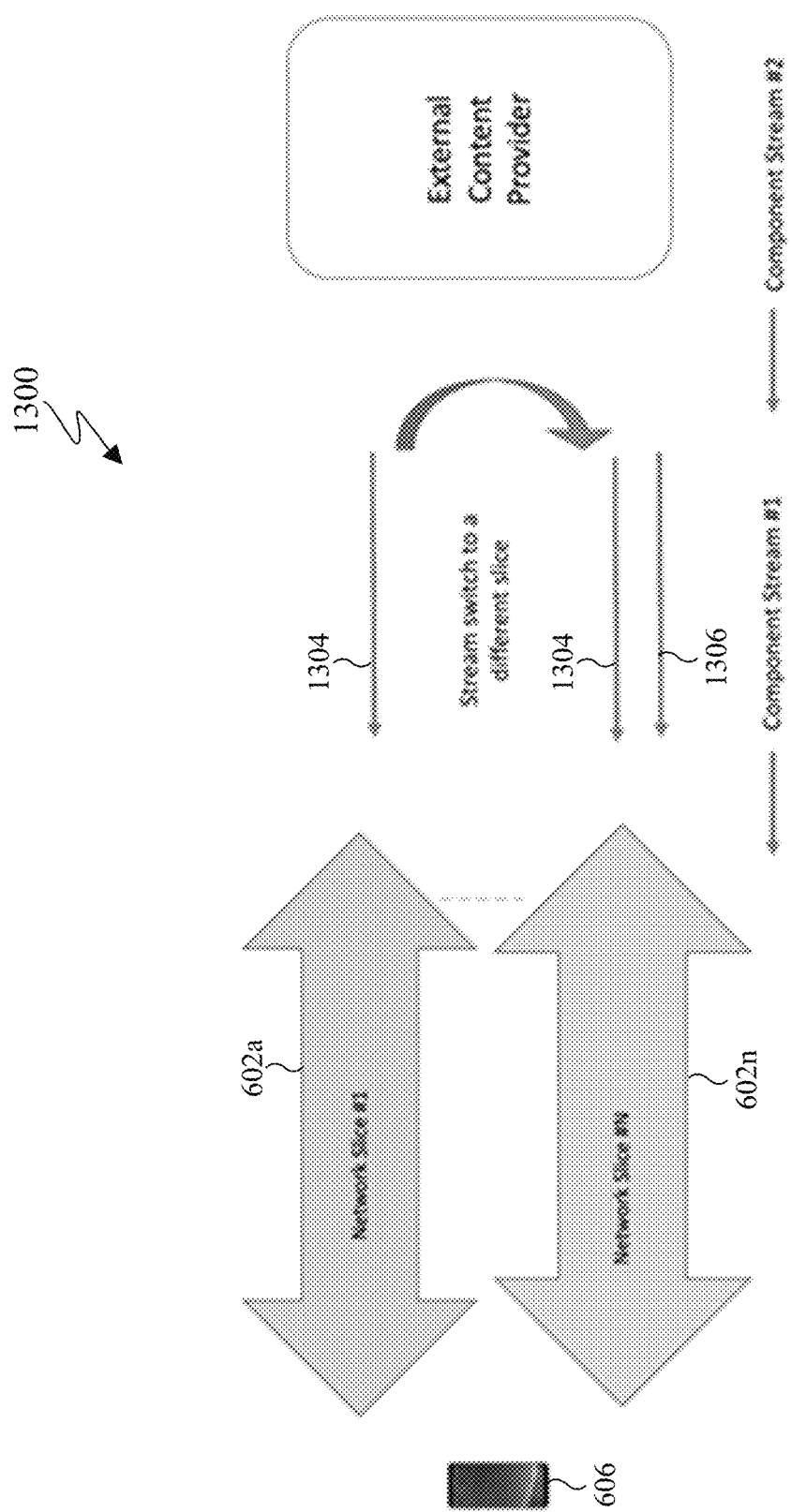
FIG. 13 illustrates an example media component stream switching to a different network slice in accordance with this disclosure.

FIG. 13 illustrates an example media component stream switching 1300 to a different network slice in accordance with this disclosure. The embodiment of the media component stream switching 1300 illustrated in FIG. 13 is for illustration only. FIG. 13 does not limit the scope of this disclosure to any particular implementation of an electronic device.

As shown in FIG. 13, network assisted media component stream switching 1300 can be performed on media service component streams 1304 between different network slices 602a and 602n. When the media component streams 1304 and 1306 are delivered using different network slices 602a and 602n, and the UE 606 and the network can observe that a network slice 602a is not able to provide the required QoS for a media component stream 1304, the media component stream 1304 can be switched to a different network slice 602n to enhance the performance of that media service component streams 1304 relative to all the other media component streams 1306 in the network slices 602.

To allow for switching certain type of information is to be provided by the application provider such as follows. Switching condition information can be provided for parameters. The switching condition information indicates when to switch a specific media component stream from one network slice to another. Such information can be in the following form shown in TABLE 8.

TABLE 8

| Switching condition information | | | |
|---|---|---|---|
| Stream Id | Parameter | Switch value | Switch to Slice Id |
| Stream Id 1 | Packet delay Inter-packet delay . . | >10 ms | Slice #5 |
| Stream id 2 | . . | | |

For each media component stream, the application provider can configure the switch values for the set of application and slice parameters. During the execution of media service, if one of the parameters pertaining to a stream drops below the indicated switch value, then the media component stream is switched to the configured Slice Id. Switch interval information indicates an amount of time switching is performed before media component streams are reverted back to the original slice they were provisioned to run. Switch time information indicates a time at which switching is allowed. Switch stream priority information provides priority information about which slice can each media component stream can be switched to among a set of slices that the stream can be switched to. Coverage area information indicates users in this coverage area (e.g., geographic area such as cell Id list, geocoordinates, etc.) that can be switched to another slice. UE 606 list indicates a list of users whose streams can be switched (e.g., priority user list).

The UE 606 can request switching of media component flows between different network slices. In addition to the network assisted switching of media component flows between different network slices, the UE can request stream switching of media component flows between different network slices.

The UE 606 has metrics related to the media component streams along with the buffer status information for different media component flows. Based on this information, the UE 606 can trigger a message to the application function managing the media service to switch one or more media component streams 1304 to a different network slice 602n. Such a message from the UE 606 can include the below information shown in TABLE 9.

TABLE 9

| Information elements in message from UE for requesting switching of media component streams to a different slice | |
|---|---|
| Information element | Description |
| Stream Id | ID of the media component flow that needs to be switched |
| Slice Id | ID of the network slice to which the above media component stream is to be switched to |
| Reason | Reason because of which the stream switch is sought. Such reason information can include any of the below information: Measurement information of a parameter that is performing badly. Any of the parameters described in this disclosure can be specified by the UE to show how badly the stream delivery is happening with respect to that parameter. Network slice unreachable: UE is not able to receive any packets/frames from another network slice because of which the UE is requesting switching of media component flow from that slice to the slice given by the Slice Id in this table. If this reason is included, then the UE will also include information of the Id of the slice that is unreachable by the UE because of which such a stream switch is sought |

When the application function in the network receives the above information from the UE 606, the application function can re-configure the delivery parameters to assist with transmitting the requested media component stream in the slice that is requested by the UE 606. In addition, based on the reasoning information received from the UE 606, the application function can perform the following functions.

If the reason indicates that one or more parameters of the network slice is performing badly, then the application function can do any of following. A function can include re-organizing slice resources such as adding or removing network functions from the network slice to help with enhancing slice performance. Another function can include adding compute capacity or removing bottlenecks based on parameter performance information. Other functions can include re-configuring network parameters of the slice such as allowed throughput, bandwidth etc.

If the reason indicates that a network slice is unreachable by the UE, the application function can perform any of the following actions. The application function can check with network analytics functions such as 3GPP NWDAF to gather metrics about the unreachable slice in question. If the unreachable slice to the UE as indicated above is also unreachable to all the users, then the application function can restart all the physical and virtual resources. The application function can interface with the application service provider to see if the unreachable network slice can be de-provisioned and de-allocated if all users have the same experience with that network slice.

Although FIG. 13 illustrates an example media component stream switching 1300 to a different network slice, various changes may be made to FIG. 13. For example, the number and placement of various components of the media component stream switching 1300 can vary as needed or desired. In addition, the media component stream switching 1300 may be used in any other suitable network slicing process and is not limited to the specific processes described above.

Figure 14:
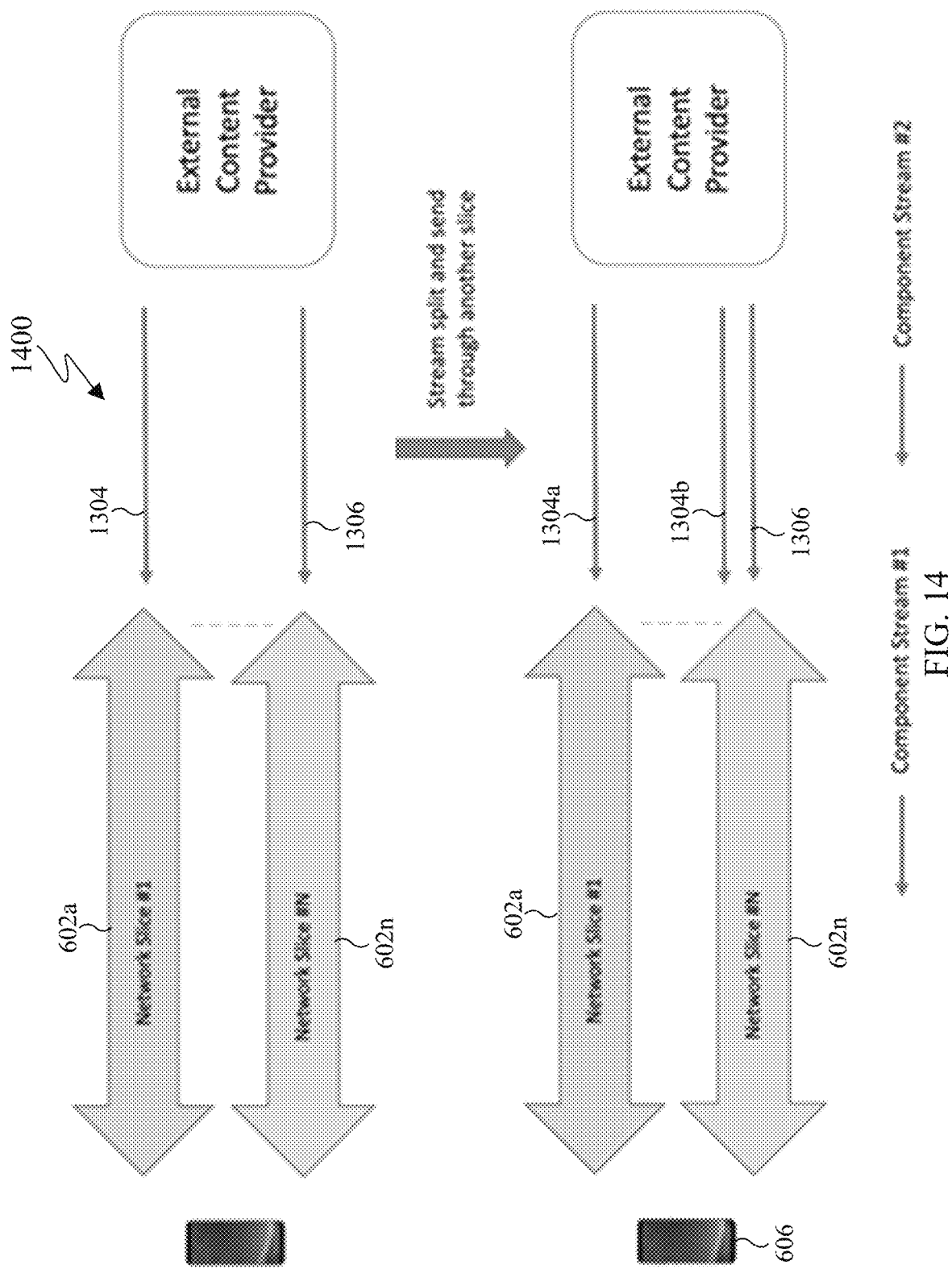
FIG. 14 illustrates an example multi-component stream splitting in accordance with this disclosure.

FIG. 14 illustrates an example multi-component stream splitting 1400 in accordance with this disclosure. The embodiment of the multi-component stream splitting 1400 illustrated in FIG. 14 is for illustration only. FIG. 14 does not limit the scope of this disclosure to any particular implementation of an electronic device.

As shown in FIG. 14, network assisted stream splitting can be performed on a media service component stream 1304. In case of the inability to switch a complete stream 1304 from a network slice 602a to another network slice 602n as described before is not possible, the media service component streams 1304 in a badly performing network slice can be split into a first media service component stream 1304a and a second media service component stream 1304b. The second media service component stream 1304b can be transferred to an alternate network slice 1304n.

To facilitate stream split, the stream switching condition information described earlier in the disclosure to be enhanced with the following information shown in FIG. 10.

TABLE 10

Information elements in message from UE for media component stream splitting

| Stream Id | Split function | Send Split stream to slice ids (alternate slices) |
|---|---|---|
| Stream id 1 | | |
| . . | | |

For each stream, a split function information can be provided by the application service provider to split the stream and send that split stream in specific network slices. The possible values of the split function can include a split-equally value, a every nth packet/frame value, an every "time interval" value, etc. The split-equally value can indicate stream packets or frames are split equally between the original network slice and the configured alternate slices. Every $n^{th}$ packet/frame indicates to Send every $n^{th}$ packet/frame on the configured alternative slice. Every "time interval" value indicates a packet/frame to be send in the alternate network slice at the expiry of configured time interval.

Once the packet/frame is sent out, the timer is reset, and the AS can wait until it expires again to send in alternate network slice.

Although FIG. 14 illustrates a multi-component stream splitting 1400, various changes may be made to FIG. 14. For example, the number and placement of various components of the multi-component stream splitting 1400 can vary as needed or desired. In addition, the multi-component stream splitting 1400 may be used in any other suitable network slicing process and is not limited to the specific processes described above.

Figure 15:
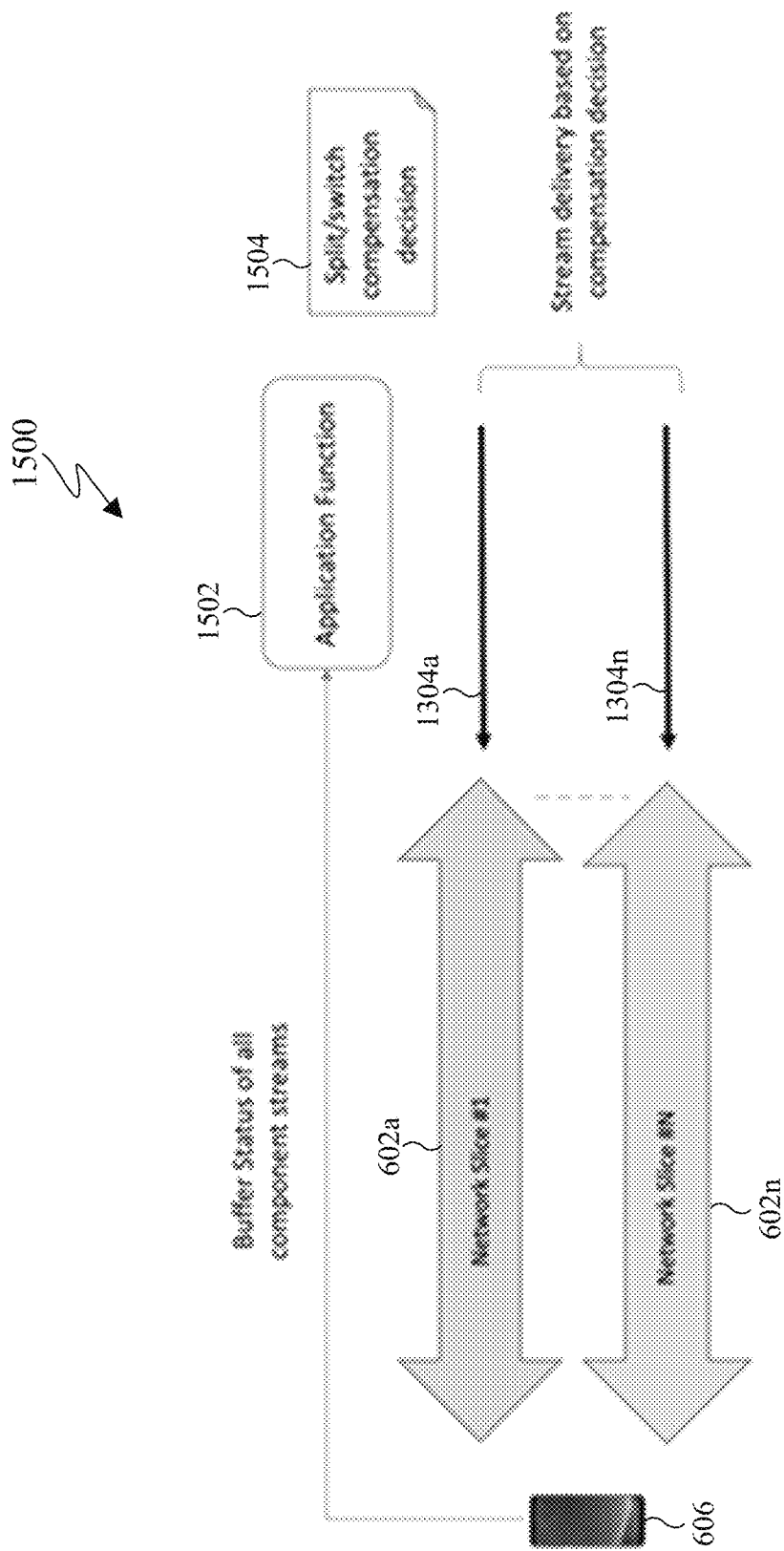
FIG. 15 illustrates an example buffer compensation of media component stream in accordance with this disclosure.

FIG. 15 illustrates an example buffer compensation 1500 of a media component stream in accordance with this disclosure. The embodiment of the buffer compensation 1500 illustrated in FIG. 15 is for illustration only. FIG. 15 does not limit the scope of this disclosure to any particular implementation of an electronic device.

As shown in FIG. 15, the UE 606 requested splitting of media component streams 1304 between different network slices 602. In addition to the network assisted splitting of media component flows between different network slices, it is possible that the UE 606 requests stream splitting of media component flows between different network slices 602a and 602n.

The UE 606 has metrics related to the media component streams along with the buffer status information for different media component flows. Based on this information, the UE 606 can trigger a message to the application function 1502 managing the media service to split one or more media component flows and send the packets/frames of the split stream in a different network slice. The application function can be represented by the server 200 shown in FIG. 2. Such a message from the UE 606 can include the below information.

TABLE 11

Information elements in message from UE for requesting splitting of media component streams

| Information element | Description |
|---|---|
| Stream Id | ID of the media component flow that needs to be switched |
| Slice Id | ID of the network slice to which the split stream of above media component stream is to be send through |
| Reason | Reason because of which the stream split is sought. Such reason information can include any of the below information: Measurement information of a parameter that is performing badly. Any of the parameters described in this disclosure can be specified by the UE to show how badly the stream delivery is happening with respect to that parameter. Network slice unreliable: UE is not able to receive some packets/frames through the network slice (e.g., because of high packet loss) because of which the UE is requesting splitting of media component flow from that slice and send the split stream through the slice given by the Slice Id in this table. If this reason is included, then the UE will also include information of the Id of the slice that is unreliable because of which such a stream split is sought |

When the application function 1502 in the network receives the above information from the UE 606, the application function 1502 can re-configure the delivery parameters to assist with splitting the requested media component stream that is requested by the UE 606. In addition, based on the reasoning information received from the UE 606, the application function 1502 can perform the certain functions. If the reason indicates that one or more parameters of the network slice is performing badly, then the application function 1502 can do any of re-organize slice resources, adding compute capacity or removing bottle necks, re-configuring network parameters, re-configure network parameters. The application function 1502 can re-organize slice resources such as adding or removing network functions from the network slice to help with enhancing slice performance. The application function 1502 can add compute capacity or remove bottlenecks based on parameter performance information. The application function 1502 can re-configure network parameters of the slice such as allowed throughput, bandwidth, etc.

If the reason indicates that a network slice is unreliable by the UE 606, the application function 1502 can perform other functions. The application function 1502 can check with network analytics functions such as 3GPP NWDAF to gather metrics about the unreliable slice in question. If the unreliable slice to the UE as indicated above is also unreliable to all the users, then the application function 1502 can restart all the physical and virtual resources. The application function 1502 can interface with the application service provider to see if the unreliable network slice can be de-provisioned and de-allocated if all users have the same experience with that slice. The application function 1502 can add UPF/MEC for synchronization.

If a stream switch or split decision cannot be made to account for synchronization issues, an alternative method is to enhance the QoS of the network slice that the media component stream is being developed. To facilitate performance enhancement, options available to the UE/network can include adding additional UPF/ULCL classifier/Branching point, adding additional AS servers, adding edge compute capabilities, etc.

The add additional UPF/ULCL classifier/Branching point can include requesting a UPF/ULCL classifier/Branching point to be added to the network slice. These new functions may provide quantitative and qualitative enhancements to the network slice. The add additional AS servers can include requesting addition of application servers to be added to the network slice. These new application servers can provide additional capacity for processing to the network slice, which can help in case the synchronization is unable to be happening because of insufficient compute resources in the network slice. The add edge compute capabilities can include deploying edge application servers and connected to this network slice. Edge application servers will provide additional compute capacity to help with any processing related to ensuring synchronization issues.

Procedure where in the network will split or switch the media component flows between different network slices were described earlier in the application. To allow for stream splitting/switching, a split/switch strategy can be performed by the application function 1502 in the network. For this procedure, UE will send the buffer status message with information of each of the media component streams of the service to the application function 1502 in the network. When the application function 1502 in the network receives this information from the UE 606, a split/strategy can be defined.

The application function 1502 can decide that a stream with a lower or lowest buffer status can be compensated by transmitting "n" number of seconds/milliseconds (stream compensation time) of stream traffic through the highest performing network slice. The highest performing network slice can be inferred based on a) buffer status of the constituent media component flow (e.g., whichever media component stream buffer status is full or almost full compared to other media component flows) or b) can be based on network measurements to show the performance of the concerned network slice. The amount to split or switch can be based on procedures described in earlier in this disclosure.

The above procedure of compensating the lower or lowest buffer media component stream can be enhanced in an alternative procedure where in instead of transmitting "n" number of seconds or milliseconds of stream traffic through the highest performing network slice, the number of seconds or milliseconds of traffic to transmit is determined by the difference in buffer status information of the lower buffer media component stream compared to higher buffer media component streams. The difference can be normalized based on the packet/frame size to determine the number of seconds/milliseconds of media component stream traffic to transmit through the higher or highest performing network slices.

The above procedure of compensating lower or lowest buffer status media component stream can be enhanced in an alternative procedure where in such compensation procedure is performed a) every "m" milliseconds/seconds (compensation interval) or b) whenever there is another update from the UE 606 about lower or lowest performing media component flows.

The above two compensation procedures can be further enhanced to in an alternative procedure where in such compensation for lower/lowest buffer media component stream is performed for a time period (total compensation time) of a) total time period "t" specified by the application service provider or b) until UE 606 gets back to the application function 1502 in the network that all the buffers are back to normal i.e. they are compensated properly. When the application function 1502 in the network receives such a message from the UE 606, the compensation procedure can be stopped for the amount of time "t" or until another compensation request message comes from the UE 606.

Although FIG. 15 illustrates a buffer compensation 1500, various changes may be made to FIG. 15. For example, the sizes, shapes, and dimensions of the buffer compensation 1500 and its individual components can vary as needed or desired. Also, the number and placement of various components of the buffer compensation 1500 can vary as needed or desired. In addition, the buffer compensation 1500 may be used in any other suitable network slicing process and is not limited to the specific processes described above.

Figure 16:
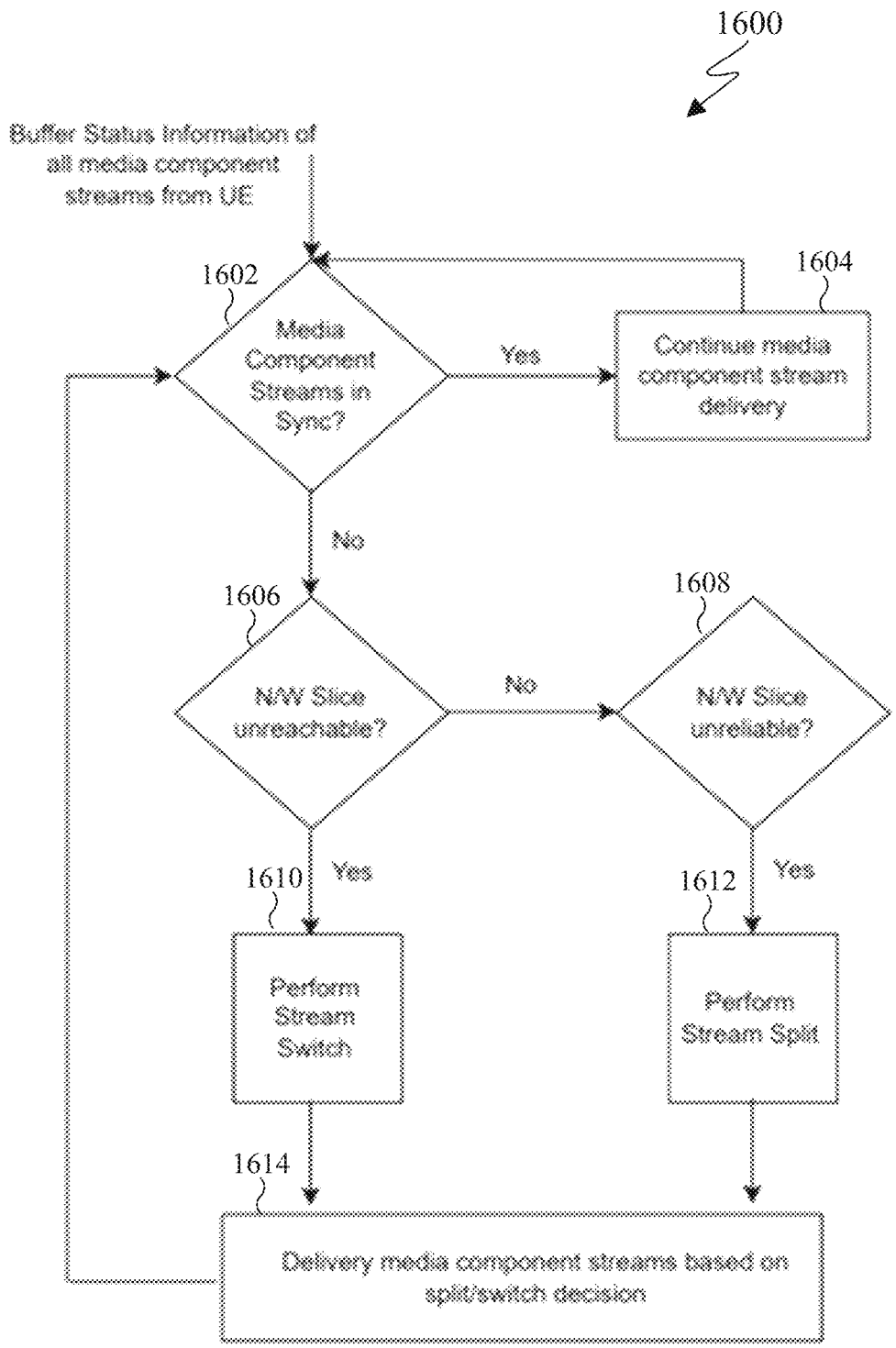
FIG. 16 illustrates an example flowchart for stream switching and splitting for buffer compensation in accordance with this disclosure.

FIG. 16 illustrates an example flowchart 1600 for stream switching and splitting for buffer compensation in accordance with this disclosure. For ease of explanation, the stream switching and splitting flowchart 1600 of FIG. 16 is described as being performed using the electronic devices of FIGS. 2 and 3. However, the stream switching and splitting flowchart 1600 may be used with any other suitable system and any other suitable electronic device.

As shown in FIG. 16, the server 200 can receive buffer status information of all media component streams from a UE 606 in step 1601. The UE 606 can take measurements of the component streams related to the buffer status. The buffer status information can be processed by the UE and transferred to the server 200.

The server 200 can determine whether the media component streams are synchronized in step 1602. The QoS for each of the media component streams can be identified by the server 200 and compared to an expected QoS for the media. The media component streams can be compared to other media component streams for synchronization of respective services.

The server 200 can continue media component stream delivery while the media component streams are synchronized in step 1604. When the media component streams are determined to be synchronized in step 1602, the media component streams can continue to transfer over a current network slice.

The server 200 can determine whether a network slice is unreachable when the media component streams are determined to not be synchronized in step 1606. When the media component streams are determined to not be synchronized in step 1602, information can be requested of the network slice to determine the communicability of the network slice.

The server 200 can determine whether a network slice is unreliable when a network slice is determined to not be unreachable in step 1608. When the network slice is determined to be reachable in step 1606, the information received from the network slice can be analyzed for reliability.

The server 200 can perform stream switching when the network slice is determined to be unreachable in step 1610. When the network slice is determined to be unreachable in step 1606, the entire media component stream can be moved to another network slice that is reachable and can handle the QoS of the media component stream.

The server 200 can perform stream splitting when the network slice is determined to be unreliable in step 1612. When the network slice is determined to be unreliable is step 1608, stream splitting can be performed on the media component stream. The media component stream can be split into at least two sub-component streams. The server 200 can determined whether one or more of the subcomponent streams can remain on the original network slice. Subcomponent streams can be moved to other network slices that can handle the transfer.

The server 200 can deliver media component streams based on the stream splitting or stream switching in step 1614. The switched media component stream or the split media subcomponent streams can continue to be monitored for synchronization of the respective media.

To facilitate stream synchronization when different media component streams are delivered using different network slices, following information can be configured for the media service by the application service provider. This configuration can apply to the M1 service provisioning interface defined in TS 26501 and TS 26512.

TABLE 12

Service configuration information from application service provider to enable stream switching and splitting for stream synchronization purposes

| Field | Description |
| --- | --- |
| Allow-stream-switching | Boolean variable to indicate whether stream switching is enabled for the media service. Possible values:<br>True: Stream switching is enabled so slice-specific synchronization functions and parent media service level synchronization functions can take decisions on switching streams to a different network slice if the QoS of the original network slice is suffering<br>False: Stream switching is not allowed for this media service |
| Switching-condition-information | Information to the slice-specific synchronization function and the parent media service level synchronization functions on switching condition information as described earlier in the disclosure. Such information includes the following information for each media component stream in the media service.<br>List of parameter descriptors where each parameter descriptor has the following information:<br>Parameter name and type<br>Switch value: Value that will trigger the switching if satisfied.<br>Switch to slice: Slice to switch the stream to<br>Switch interval: Amount of time switching is allowed before reverting back.<br>Switch time: Time at which switching is allowed.<br>Priority: provides priority information about which slice can each media component stream can be switched to among a set of slices that the stream can be switched to<br>Coverage area: Users in this coverage area (e.g., geographic area such as cell Id list, geo coordinates etc.) can be switched to another slice.<br>UE list: List of users whose streams can be switched (e.g., priority user list) |
| Allow-stream-split | Boolean variable to indicate whether stream split is enabled for the media service. Possible values:<br>True: Stream split is enabled so slice-specific synchronization functions and parent media service level synchronization functions can take decisions on split streams and them on a different network slice if the QoS of the original network slice is suffering<br>False: Stream split is not allowed for this media service |
| Stream-split-information | Information to the slice-specific synchronization function and the parent media service level synchronization functions on stream split condition information as described earlier in the disclosure. Such information includes the following information for each media component stream in the media service.<br>List of parameter descriptors where each parameter descriptor has the following information:<br>Parameter name and type<br>Split condition value: Value condition that will trigger the splitting if satisfied. |

TABLE 12-continued

Service configuration information from application service provider to enable
stream switching and splitting for stream synchronization purposes

| Field | Description |
|---|---|
| | Send split streams to slices: List of slices to send the split stream to |
| | Split interval: Amount of time splitting is allowed before reverting back. |
| | Split time: Time at which splitting is allowed. |
| | Coverage area: Streams belonging to users in this coverage area (e.g., geographic area such as cell Id list, geo coordinates etc.) can be split to configured alternate slices. |
| | UE list: List of users whose streams can be split (e.g., priority user list) |
| | Split function: Function specifying how to split the media component stream. Possible values include: |
| | Split equally: Stream split is done in such a way that packets/frames belonging to a media component stream are distributed equally among the configured list of alternate network slices along with the original network slice. |
| | Every nth packet/frame: Send every $n^{th}$ packet/frame on the configured alternative slice. |
| | Every "time interval": Packet/frame to be send in the alternate network slice at the expiry of configured time interval. Once the packet/frame is sent out, the timer is reset, and the AS will wait until it expires again to send in alternate network slice. |
| | Split based on frame type (e.g., I/P/B frames). Following options are possible. |
| | All "I" frames in original slice and P/B frames in alternate slices |
| | All P/B frames in original slice and I frames in alternate slice. |
| | Split based on GOP. Following options are available: |
| | Split based on 1 GOP size i.e., subsequent GOP frames are delivered through different network slices. |
| | Split based on "n" GOP sizes i.e continuous "n" GOP frames are delivered through the same slice and the next "n" GOP frames delivered through alternate network slices. |
| | Split based on video resolution: High quality stream on original stream and low quality stream on alternate slices or vice versa. |
| | Alternate slices to send split streams to: List of alternate slices to which the split streams can be sent to |
| Enhance-slice-processing | Options to request additional processing to network slicing. Following options are possible: |
| | Add UPF/ULCL classifier/Branching point: A UPF/ULCL classifier/Branching point can be requested to be added to the network slice as described earlier in disclosure. |
| | Add additional AS servers: Add more application servers to increase processing capacity. |
| | Add edge computing: Add edge application servers to increase processing capacity |
| Allow-buffer-compensation-using-stream-switch-and-split-inference | Boolean variable to indicate whether buffer compensation using stream switching and splitting decision making in the network is enabled. Possible values: |
| | True: Buffers of individual media component streams can be individually compensated based on stream and splitting decision making in the network |
| | False: Buffers of individual media component streams cannot be individually compensated based on stream and splitting decision making in the network |
| | If this option is enabled by the application service provider, UE can send the buffer status information of individual media component streams to the application function in the network and receive packets/frames of lower performing network slices through higher performing network slices as described earlier in the disclosure. |
| stream-compensation-time | Number of milliseconds/seconds of time lower buffer media component streams to be transmitted using the higher/highest performing network slice for buffer compensation |
| Allow-inference-of-stream-compensation-time | Boolean variable to indicate whether stream compensation time can be inferred using buffer status information of all media component streams of the media service as described earlier in the disclosure. Possible values: |
| | True: Stream compensation time can be inferred using buffer status information of all media component streams of media service. |

TABLE 12-continued

Service configuration information from application service provider to enable
stream switching and splitting for stream synchronization purposes

| Field | Description |
|---|---|
| | False: Stream compensation time cannot be inferred using buffer status information of all media component streams of media service. In this case, stream compensation time is solely determined by the configuration of application service provider |
| Compensation-interval | Interval at which the buffers of lower performing media component streams can be transmitted through the higher/highest performing network slice |
| Total-compensation-time | Total time the buffer compensation procedure described in this disclosure to be performed. |

In the main embodiment, a method is described to split the media component stream delivered in a network slice so the split streams can be delivered using multiple alternate network slices so as to preserve the synchronization aspects between different media components delivered using multiple network slices. Towards this, a method was proposed to split the media component stream by application service provider specified split function configuration.

In an alternate embodiment, a variation of the stream split can be performed using the type of media component packets/frames. For example, if a video stream delivered using a network slice (e.g., through the emBB network slice) is suffering of bad QoS of any reason, a stream split decision 1504 can be made by the UE/network to split the stream packets/frames into multiple network slices. Instead of plainly looking at the packet count for split decision, the type of video packets/frames (e.g., "I" frame, "P" frame, "B" frame) can be looked at for split function. Example of such split decisions could be:

Stream split such that all "I" frames are delivered through the same network slice, but "P" and "B" frames can be offloaded to a different network slice. Stream reconstruction at the UE might be easier if all "I" frames are delivered through the same network slice.

Stream split based on GOP (Group of Picture) size i.e., all frames belonging to the same GOP are delivered on the same network slice, and a different GOP could be decided to be delivered in the alternate network slice.

Stream split such that "n" continuous GOPs are delivered through the same network slice and the next GO frames could be offloaded to a different network slice.

In different embodiments in disclosure, described are methods for stream split based on split function configuration from application service provider and type of media stream packets/frames. This alternative embodiment describes a method for stream split based on stream resolution.

Some of the media services require sending multiple resolution streams to end users to avoid lossy conditions at the UE. For example, depending on the UE viewport, a high quality stream is sent to the UE that covers the UE viewport, and for all the rest of the view, a lower quality stream is sent. The objective in this case is that user will have a continuity in service even if there are quick view port changes and until the high quality stream for updated view port is retrieved and displayed to the UE. This method of sending multiple quality streams can be advantage of during stream split decisions 1504. If the network slice that is carrying the video stream is suffering because of bad QoS, then another stream split decision 1504 can be made is to send the either the higher or lower quality stream through a different network slice. The conditions when to invoke this procedure is configured by the application service provider. When such conditions satisfy, the media synchronization functions (both the slice-specific synchronization functions and the parent media service level synchronization functions) can do the stream split and send those split streams through different network slices.

Although FIG. 16 illustrates one example of an example flowchart 1600 for stream switching and splitting for buffer compensation, various changes may be made to FIG. 16. For example, while shown as a series of steps, various steps in FIG. 16 may overlap, occur in parallel, or occur any number of times.

Figure 17:
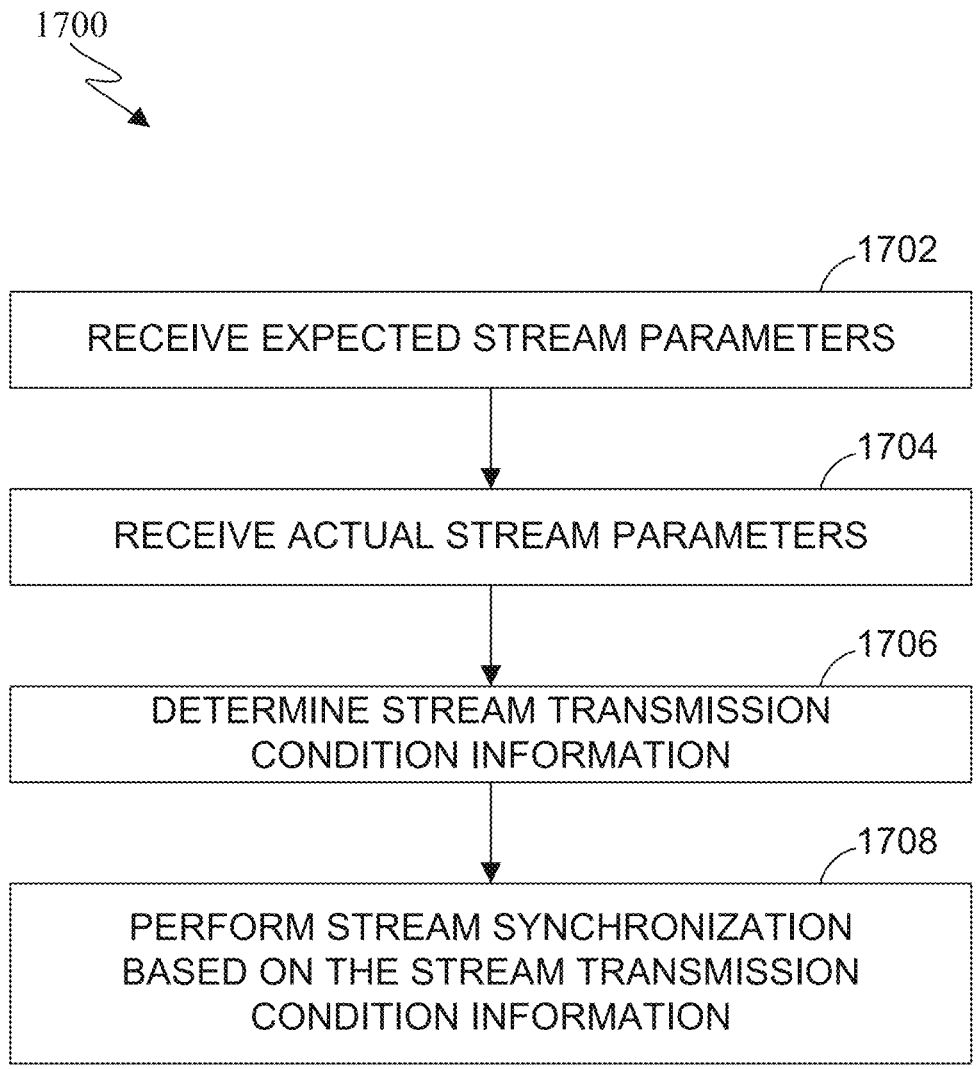
FIG. 17 illustrates an example method for network assisted stream synchronization for media service using network slicing according to this disclosure.

FIG. 17 illustrates an example method 1700 for network assisted stream synchronization for media service using network slicing according to this disclosure. For ease of explanation, the method 1700 of FIG. 17 is described as being performed using the electronic devices of FIGS. 2 and 3. However, the method 1700 may be used with any other suitable system and any other suitable electronic device.

As shown in FIG. 17, the server 200 receives expected stream parameters at step 1702. The expected stream parameters for a plurality of media streams provided over at least one network slice can be received from an application service provider. Stream transmission thresholds can also be received from an application service provider.

The server 200 receives actual stream parameters at step 1704. The actual stream parameters can be received for each of the media streams. The plurality of media stream can be provided over multiple network slices. The actual stream parameters can be received as sample frames for each of the media streams from the multiple network slices. The actual stream parameters can be measured based on the sample frames.

The server 200 determines stream transmission condition information at step 1706. The stream transmission condition information can be determined for each of the media streams. The stream transmission condition information is based on a comparison of the actual stream parameters and the expected stream parameters.

Sets of trace functions can be setup in each of the network slices to exchange synchronization information with each other trace function. Trace groups of trace functions can also be setup in the network slices. Each trace function in a trace group function can be configured to only exchange synchronization with each other trace function in the trace function group. Packet forwarding actions can be performed based on the exchanged synchronization information.

The server 200 performs stream synchronization based on the stream transmission condition information at step 1708. When the stream transmission condition information for a media stream exceeds the stream transmission threshold, the media stream is can be switched to a different network slice or can be split into a first media stream and a second media stream with the second media stream being switched to a different network slice from the first media stream.

Although FIG. 17 illustrates one example of a method 1700 for network assisted stream synchronization for media service using network slicing, various changes may be made to FIG. 17. For example, while shown as a series of steps, various steps in FIG. 17 may overlap, occur in parallel, or occur any number of times.

Figure 18A:
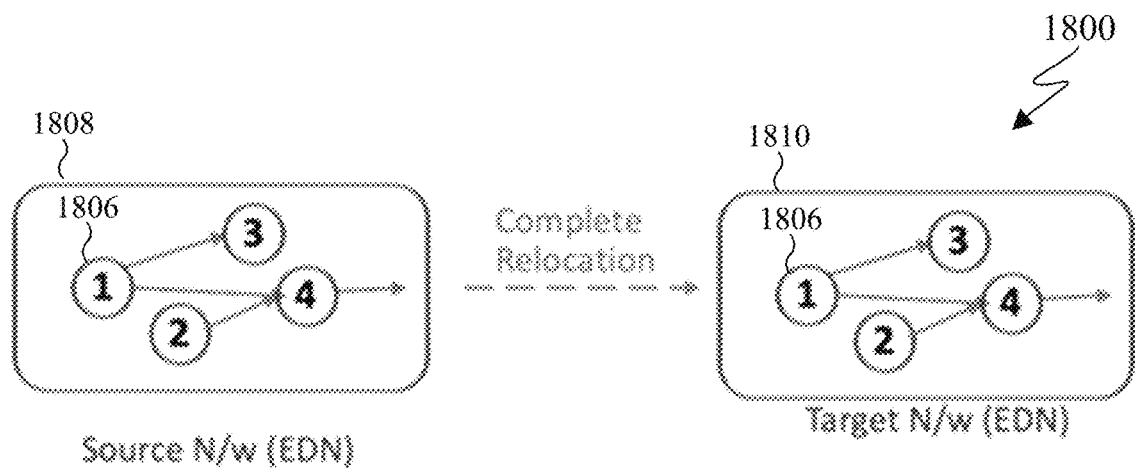
FIGS. 18A and 18B illustrate example workflow relocations in accordance with this disclosure.
Figure 18B:
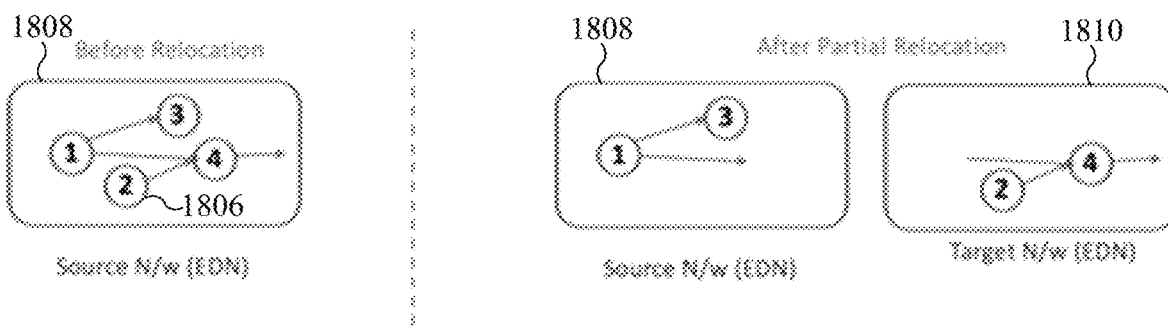

FIGS. 18A and 18B illustrates example workflow relocations 1800-1804 in accordance with this disclosure. The embodiments of the workflow relocations 1800-1804 illustrated in FIGS. 18A and 18B are for illustration only. FIGS. 18A and 18B do not limit the scope of this disclosure to any particular implementation of an electronic device.

As shown in FIGS. 18A, a complete workflow relocation 1800 transfers all the application service components 1806 that are part of the workflow running inside the source network 1808 to the target network 1810. The application service components 1806 of the workflow (components 1, 2, 3, and 4) in the source network 1808 are moved to the target network 1810. All configuration of the application service components 1806, properties of network paths, and expected key performance indicators (KPIs) can be migrated to the target network 1810 as is. With this kind of deployment, relocating the application service components 1806 is seamless and the performance of the application will closely resemble the performance when all the application service components 1806 are in the source network 1808 provided appropriate resources are provisioned in the target network 1810 based on expected KPI.

As shown in FIG. 18B, a partial workflow relocation 1802 can transfer a subset of the application service components 1806 that are part of the workflow running in the source network 1808 to the target network 1810. With the partial workflow relocation 1802, a subset of application service components 1806 of the workflow (components 2 and 4) in the source network 1808 are moved to the target network 1810 and the rest of the application service components 1806 (components 1 and 3) can remain in the source network 1808.

Although FIGS. 18A and 18B illustrate example workflow relocations, various changes may be made to FIGS. 18A and 18B. For example, the number and placement of various components of the workflow relocations 1800-1804 can vary as needed or desired. In addition, the workflow relocations 1800-1804 may be used in any other suitable network slicing process and is not limited to the specific processes described above.

Figure 19:
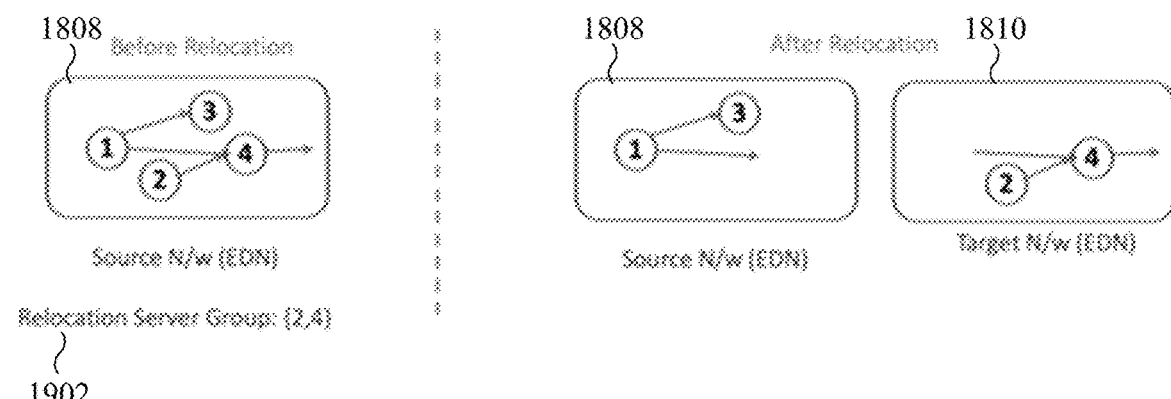
FIG. 19 illustrates an example server group relocation in accordance with this disclosure.

FIG. 19 illustrates an example server group relocation 1900 in accordance with this disclosure. The embodiment of the server group relocation 1900 illustrated in FIG. 19 is for illustration only. FIG. 19 does not limit the scope of this disclosure to any particular implementation of an electronic device.

As shown in FIG. 19, server group relocation 1900 can be used to transfer application service components 1806 that have functional dependencies. Some application service components 1806 within a workflow have close dependency with other application service components 1806 in the workflow. The close dependency could be due to a number of reasons such as performance, security, compliance, etc. With close dependency when there are functional dependencies between different application service components 1806 in the workflow and if a decision is made to relocate one or more application service components 1806, then the dependent application service components 1806 can also be relocated.

Before server group relocation, application servers 2 and 4 are part of a relocation server group 1902. If a decision is made by the application manager, AF, UE, or ASP to relocate server 2, then the dependent server 4 is also relocated along with server 2. If the dependent application service component 1806 cannot be relocated for any reason, then the application service components in the relocation server group 1902 may not be relocated.

For multiple relocation server groups 1902 within a workflow, the ASP configures the relocation server groups 1902 as part of the service provisioning procedure. When a decision to relocate an application service component 1806 is made, all the relocation server groups 1902 in which the currently to-be-relocated application service is found to a member of, is examined to see all the dependency relationships between other application service components 1806 in the workflow, and a decision is taken to relocate all those dependent application service components 1806 as well. If the dependent application servers components 1806 cannot be relocated, the application service provider can determine whether only the current to-be-relocated application service component can be relocated individually.

Although FIG. 19 illustrates an example server group relocation, various changes may be made to FIG. 19. For example, the number and placement of various components of the server group relocation 1900 can vary as needed or desired. In addition, the server group relocation 1900 may be used in any other suitable network slicing process and is not limited to the specific processes described above.

Figure 20A:
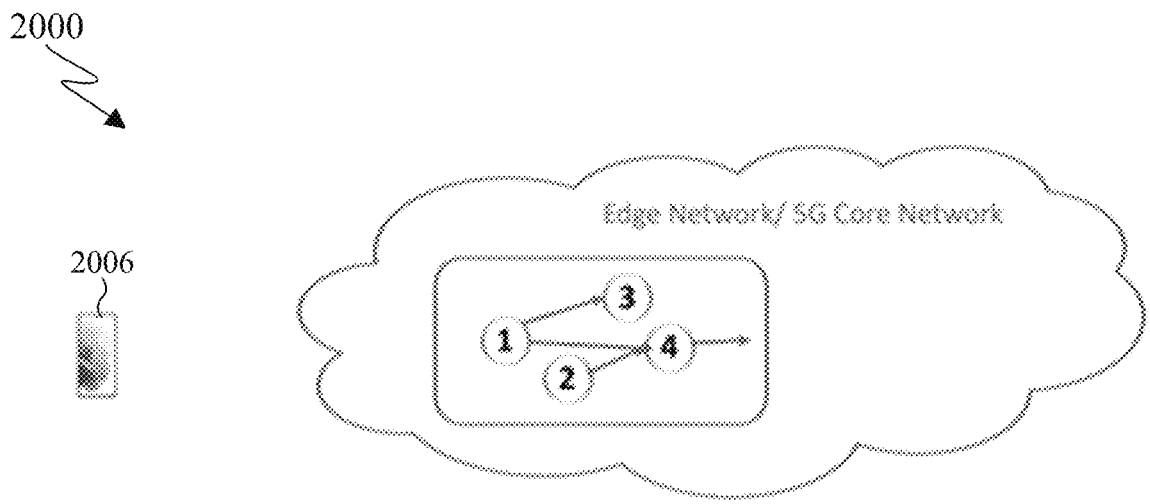
FIGS. 20A through 20C illustrate example workflow relocations to a user equipment in accordance with this disclosure.
Figure 20B:
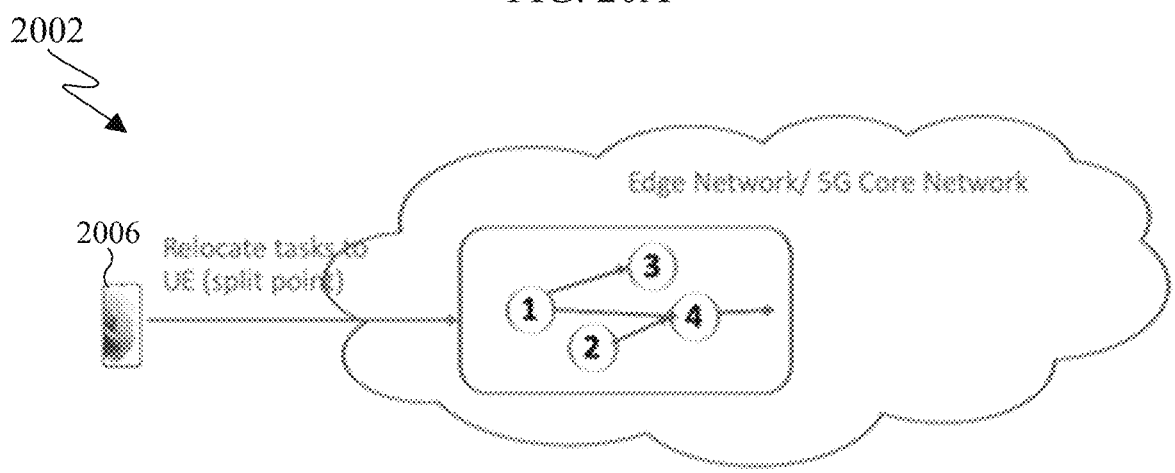
Figure 20C:
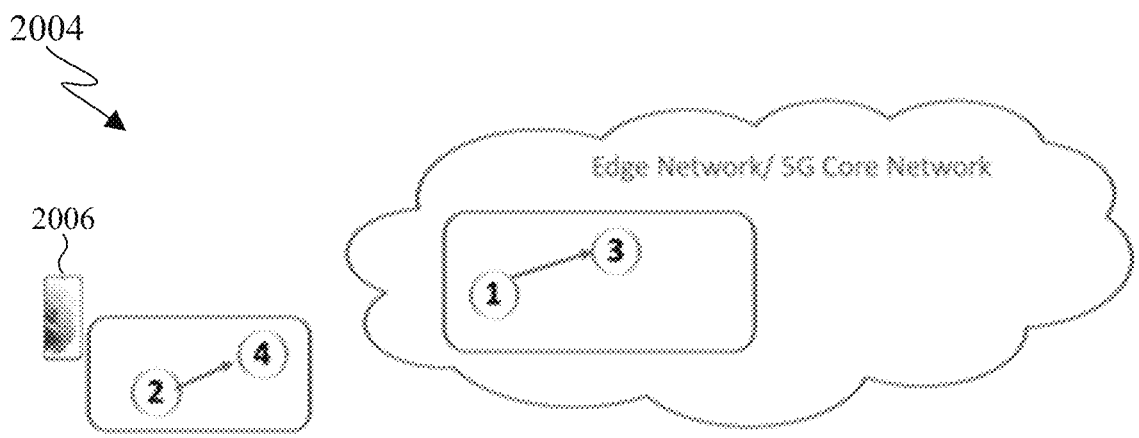

FIGS. 20A through 20C illustrate example workflow relocations 2000-2004 to a user equipment in accordance with this disclosure. The embodiments of the workflow relocations 2000-2004 illustrated in FIGS. 20A through 20C are for illustration only. FIGS. 20A through 20C do not limit the scope of this disclosure to any particular implementation of an electronic device.

As shown in FIGS. 20A through 20C, application service components 1806 can be moved by a UE 2006 workflow relocation. A UE 2006 can receive the workflow description from the AF that is managing the session or the application manager in the source network. Based on expectation of certain conditions (e.g., UE 2006 can move to a different location in some time), the UE 2006 can request the AF that is managing the session to do a workflow relocation. To request relocation of workflow, the UE 2006, using an M5d interface shown in FIG. 4, can send an API request for workflow relocation to a target location. As part of the API request, following information elements in TABLE 13 can be provided to the AF.

TABLE 13

| Information element | Description |
| --- | --- |
| Workflow Id | Workflow Identifier in case the workflow identifier was sent to the UE 2006 instead of the complete workflow description. Even in case the complete description of workflow was shared with UE 2006, the UE 2006 can still provide just the Workflow identifier to the AF |
| Workflow profile information | Detail workflow profile information of the workflow in case the profile information was shared to the UE 2006, and the UE 2006 wishes to share the entire information |
| Reduced application service component list | A subset of application service components to be relocated instead of the complete workflow |
| Reduced connection map | Connection map with detail links, link properties, and KPIs of network links interconnecting different application service components in the Reduced application service component list |
| Expected KPIs post relocation | KPIs expected post workflow relocation. The expected KPIs can be higher or lower than the KPIs available currently to the session. The list of KPI parameters could include:<br>Application latency<br>Throughput<br>Bandwidth<br>Packet error rate<br>Reliability<br>Coverage<br>KPIs currently available to the UE session can be informed to the UE 2006 by the AF that is managing the session |
| Location at Time period | Expected location of the UE 2006 at the time period when the relocation can start |
| Time period | Time when the relocation can start |
| Relocation trial interval | Time interval for which the target network 1810 should wait for traffic from the UE 2006 after the given time period. |
| List of Application Data Descriptors | Intermediate data of application service components so execution can resume instead of restarting after relocation<br>Each member of the list is a descriptor of application data corresponding to an application service component in the workflow. Application data for each application service component can have the following information:<br>Intermedia configuration data: Configuration information corresponding to the different variables and parameters of the application service component that may have changed during the course of execution of the application service component.<br>Binary app data: Application data corresponding to the execution data of application service component<br>Log data: All logging information related to application service component that may have to be made available in the target network 1810 after relocation |
| Callback-endpoint-details | Endpoint details of the UE 2006 in case AF needs to send optional data to the UE 2006 that the UE 2006 can use for further processing |

When the AF that is managing the session gets the API request with above information elements, the AF can attempt to do the workflow relocation provided the KPIs in the API can be satisfied. If the KPIs can be satisfied, the AF can communicate with the appropriate target network 1810 closer to the expected location of the UE 2006 at the given relocation time period. The AF can send the detail workflow profile information to the application manager in the target network 1810 to instantiate different application service components and necessary network paths so services can be up and running before the relocation can happen. Once the relocation time period approaches, the target network 1810 can wait for a time period indicated in a "relocation trial interval" to see if UE traffic reaches the target network 1810. If the UE 2006 traffic arrives in the target network 1810 before the expiry of the above relocation trial interval, then the relocation attempt is considered successful, and session should continue as expected. On the other hand, if the UE 2006 traffic does not arrive within the above relocation trial interval time period, then the relocation condition did not evaluate (e.g., UE 2006 may have decided not to change location after sending the API request to the AF). In this case, the relocation resources can be terminated.

The UE 2006 can request relocation of workflow resources to a target network 1810 when the UE 2006 receives the workflow profile information. Alternatively, the UE 2006 may have certain processing capabilities which the UE 2006 can take advantage of workflow processing. In this case, the UE 2006 may be interested in (e.g., authorized by end user through some action), or provisioned to do certain processing of the workflow for the media service. As a result, the UE 2006 may request onloading of certain processing tasks of the workflow onto the device, and thereby helping the end-to-end processing of the workflow. With this facility, some of the application service components that were originally run in the network (e.g., cloud, edge etc.) can now run in the UE 2006 to utilize processing UE 2006 capabilities.

To onload some processing tasks of the workflow, the UE 2006 can exchange the same information elements over the M5d interface to the AF that is managing the session. However, in this case, the semantics of the some of the fields are as described below.

A reduced application service component list field can represent a list of application service components that the UE 2006 is willing to run on the device. Hence any related processing of these application service components can now be freed in the network.

A list of application data descriptors field serves as pointers to structures that the AF can fill the data in before allowing the tasks to be run in the UE 2006. The child elements of this information element shall be used as intermediate configuration data, binary app data, and log data.

The Intermediate configuration data provides current configuration data for the tasks running in the network before moving the tasks to the UE 2006. When the application service components are moved to run in the UE 2006, this configuration data shall be used to configure the application service components.

The binary app data provides application data corresponding to the execution data of the application service components running in the network. When the application service components are relocated to UE 2006, the binary app data can be used by the application service components to continue their execution, instead of restarting the components execution.

The log data includes logging information related to application service components that were running in the network before the application service components are decided to be relocated to UE 2006. When the application service components are relocated to UE 2006, the log data can be used for important tasks (e.g., tracing).

Determining a split point of network processing is one of the evolving problems in AI. With the above structure, the UE 2006 can signal the split point of processing to the network so the UE 2006 can indicate certain parts of the processing in the device, thereby onloading some of the processing in the network (cloud).

In addition to the end-to-end KPIs of the service or session configured by the application service provider, KPIs can be defined for the relocation server groups. Some of the KPI parameters that can be defined for the relocation server group can include application latency, throughput, bandwidth, packet error rate, reliability, coverage, inter-task delay.

As the end-to-end KPIs define the expected KPI for the application service components in the service, KPIs for the relocation service groups define expected KPIs for the application service components in the relocation server group. The AF managing the session makes sure that given a KPI for relocation service group and the application service components within that relocation server group together satisfy that KPI condition. From the above, it is clear that the KPI for relocation server group is a subset of the end-to-end KPIs configured for the whole service.

For different relocation service groups configured by the application service provider for the media service, a set of KPIs can be defined by the application service provider for each application service within each relocation service group (node KPIs). In addition, for each link interconnecting the relocation service components within the main workflow, link KPIs can be provisioned by the application service provider.

When there are node KPIs for different application service components and link KPIs for interconnecting them within a relocation service group, the AF managing the session can check to see if the provisioned KPI can be provided at the target network for the relocation server group. If KPIs cannot be guaranteed after relocation for the relocation server group, the decision can be left to the application service provider to determine whether the inability to satisfy the KPI for relocation service group can be ignored and the relocation can still happen.

To support relocation server group KPIs, the service provisioning information can be enhanced to include the following information shown in TABLE 14 as part of the M1d provisioning information from the application service provider to the AF when the service is provisioned.

TABLE 14

| Field | Description |
| --- | --- |
| relocation-server-group-node-KPI-list | List of relocation server group-node-KPIs where each member of the list represents the KPIs for different application service components within one relocation server group. |
| relocation-server-group-link-KPI-list | List of relocation server group-link-KPIs where each member of the list represents the KPIs for different communication links interconnecting different application service components within one relocation server group. |

Although FIGS. 20A through 20C illustrate example workflow relocations, various changes may be made to FIGS. 20A through 20C. For example, the number and placement of various components of the workflow relocations 2000-2004 can vary as needed or desired. In addition, the workflow relocations 2000-2004 may be used in any other suitable network slicing process and is not limited to the specific processes described above.

Figure 21:
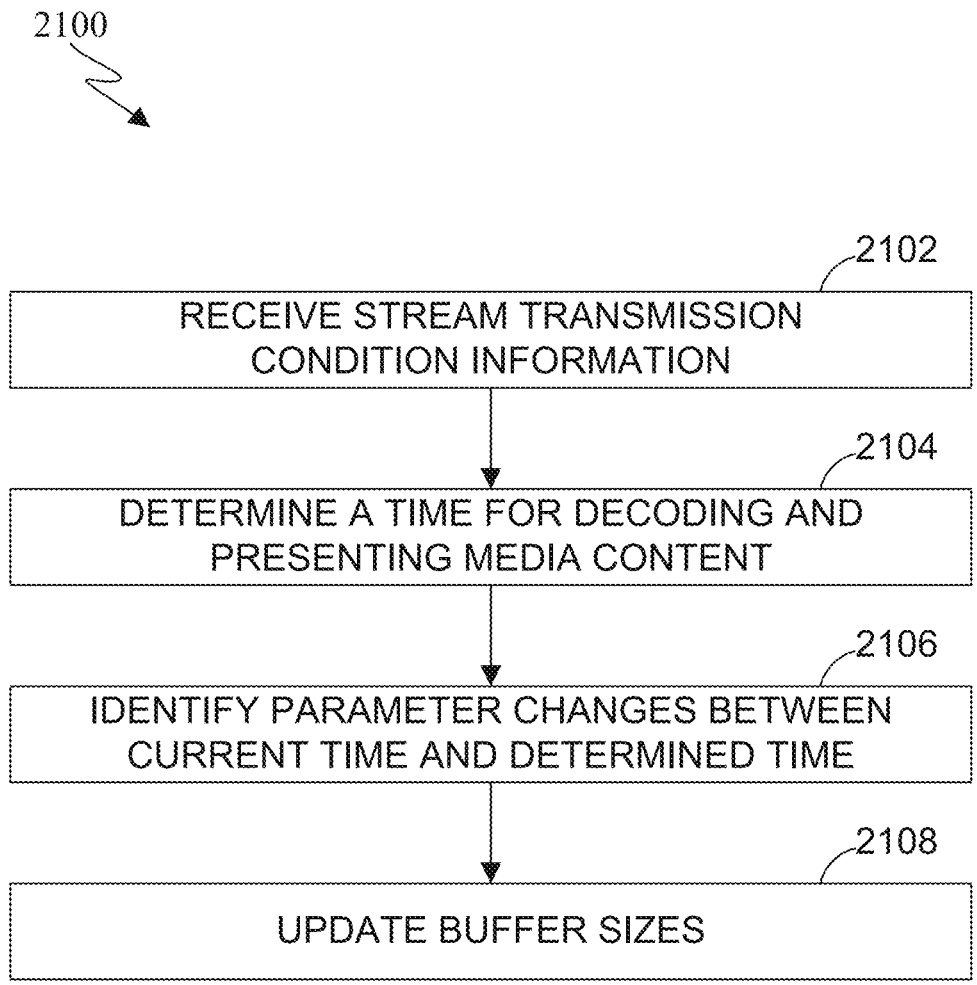
FIG. 21 illustrates an example method for network assisted stream synchronization for media service using network slicing according to this disclosure.

FIG. 21 illustrates an example method 2100 for network assisted stream synchronization for media service using network slicing according to this disclosure. For ease of explanation, the method 2100 of FIG. 21 is described as being performed using the electronic devices of FIGS. 2 and 3. However, the method 2100 may be used with any other suitable system and any other suitable electronic device.

As shown in FIG. 21, the electronic device 300 receives stream transmission condition information at step 2102. The stream transmission condition information can be received from a slice synchronization function. The stream transmission condition information can be based on a comparison of actual stream information for media streams and expected stream parameters associated with an application service provider.

The electronic device 300 can determine a time for decoding and present media content at step 2104. The time for decoding and presenting media content can be determined based on the stream transmission condition information. The time for decoding and presenting media content can be provided in one or more of the media components streams and provided directly from a synchronization application function. In certain embodiments, the time for decoding and presenting media content can be provided from an application service provider.

The electronic device 300 can identify parameter changes between a current time and the determined time at step 2106. Components of the media content can be identified in a specified component stream with a time stamp. The time stamp can be compared to the time for decoding and presenting media. The difference in the time stamp and the time for decoding media can be the parameter change for the specified media component stream.

The electronic device 300 can update buffer sizes at step 2108. A trace function or synchronization application function in the specified network slice can adjust the timing or buffer of the media component stream to accommodate for the identified parameter changes. The updated buffer size allows for the media content to be synchronized while being received over different network slices.

Although FIG. 21 illustrates one example of a method 2100 for network assisted stream synchronization for media service using network slicing, various changes may be made to FIG. 21. For example, while shown as a series of steps, various steps in FIG. 21 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface configured to:
receive, from an application service provider, expected stream parameters for a plurality of media streams provided over multiple network slices; and
receive actual stream parameters for each of the plurality of media streams; and
a processor operably coupled to the communication interface, the processor configured to:
determine stream transmission condition information for each of the plurality of media streams, wherein the stream transmission condition information is based on a comparison of the actual stream parameters and the expected stream parameters;
setup:
sets of trace functions in more than one of the multiple network slices, wherein each trace function from the sets of trace functions is configured to exchange synchronization information with each other trace function, or
trace function groups in more than one of the multiple network slices, wherein each trace function from the trace function groups is configured to only exchange synchronization information with each other trace function in the trace function groups; and
perform stream synchronization based on the stream transmission condition information for each of the plurality of media streams,
the communication interface is further configured to, based on the exchanged synchronization information, perform packet forwarding actions.

2. The apparatus of claim 1, wherein:
to receive the actual stream parameters, the communication interface is configured to receive sample frames for each of the plurality of media streams from the multiple network slices; and
the processor is configured to measure the actual stream parameters based on the received sample frames.

3. The apparatus of claim 1, wherein:
the communication interface is further configured to receive, from the application service provider, a stream transmission condition threshold; and
the processor is further configured to, when the stream transmission condition information for a media stream exceeds the stream transmission condition threshold, switch the media stream to a different network slice.

4. The apparatus of claim 1, wherein:
the communication interface is further configured to receive, from the application service provider, a stream transmission condition threshold; and
the processor is further configured to, when the stream transmission condition information for a media stream exceeds the stream transmission condition threshold, split the media stream into a first media stream and a second media stream and switch the second media stream to a different network slice from the first media stream.

5. The apparatus of claim 1, wherein:
the communication interface is further configured to receive, from a user equipment, a request to switch at least a portion of a media stream; and
the processor is further configured to switch at least the portion of the media stream to a different network slice.

6. A method comprising:
receiving, from an application service provider, expected stream parameters for a plurality of media streams provided over multiple network slices;
receiving actual stream parameters for each of the plurality of media streams;
determining stream transmission condition information for each of the plurality of media streams, wherein the stream transmission condition information based on a comparison of the actual stream parameters and the expected stream parameters;
setting up:
sets of trace functions in more than one of the multiple network slices, wherein each trace function from the sets of trace functions exchanges synchronization information with each other trace function, or
trace function groups in more than one of the multiple network slices, wherein each trace function from the trace function groups only exchanges synchronization information with each other trace function in the trace function groups;
performing stream synchronization based on the stream transmission condition information for each of the plurality of media streams; and
based on the exchanged synchronization information, performing packet forwarding operations.

7. The method of claim 6, wherein:
receiving the actual stream parameters comprises:
receiving sample frames for each of the plurality of media streams from the multiple network slices; and
measuring the actual stream parameters based on the received sample frames.

8. The method of claim 6, wherein the method further comprises:
receive, from the application service provider, a stream transmission condition threshold; and
when the stream transmission condition information for a media stream exceeds the stream transmission condition threshold, switching the media stream to a different network slice.

9. The method of claim 6, wherein the method further comprises:
receiving, from the application service provider, a stream transmission condition threshold; and
when the stream transmission condition information for a media stream exceeds the stream transmission condition threshold, splitting the media stream into a first media stream and a second media stream and switch the second media stream to a different network slice from the first media stream.

10. The method of claim 6, the method further comprises:

receiving, from a user equipment, a request to switch at least a portion of a media stream; and switching at least the portion of the media stream to a different network slice.

\* \* \* \* \*